(12) United States Patent
Takemasa et al.

(10) Patent No.: US 6,373,795 B2
(45) Date of Patent: *Apr. 16, 2002

(54) APPARATUS FOR REPRODUCING AN OPTICAL DISC

(75) Inventors: Kaoru Takemasa; Susumu Yoshida; Toru Suzuki; Kenjiro Ido; Masami Fujimoto; Kenji Uchiyama; Tomomichi Kimura; Takashi Mizoguchi, all of Saitama-ken; Michihiro Satoh; Tetsuya Niino, both of Yamagata-ken, all of (JP)

(73) Assignees: Pioneer Electronic Corporation; Tohoku Pioneer Electronic Corporation, Yamagata-ken, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,099

(22) Filed: Mar. 19, 1999

(30) Foreign Application Priority Data

Mar. 20, 1998 (JP) .......................................... 10-072910

(51) Int. Cl.[7] .......................... G11B 17/04; G11B 17/22

(52) U.S. Cl. ............................. 369/30.85; 369/178.01; 369/191

(58) Field of Search ............................. 369/75.1–77.2, 369/178, 191–194, 30.85, 30.89, 178.01, 30.9

(56) References Cited

U.S. PATENT DOCUMENTS

| | | | | |
|---|---|---|---|---|
| 4,561,078 A | * | 12/1985 | Nakayama | 369/38 |
| 5,036,509 A | * | 7/1991 | Kobayashi et al. | 369/75.2 |
| 5,555,239 A | * | 9/1996 | Takai et al. | 369/192 |
| 5,970,042 A | * | 10/1999 | Fujimoto et al. | 369/247 |

FOREIGN PATENT DOCUMENTS

| | | |
|---|---|---|
| DE | 197 25 169 A1 | 12/1997 |
| EP | 0 391 424 | 10/1990 |

\* cited by examiner

Primary Examiner—William Klimowicz
(74) Attorney, Agent, or Firm—Arent Fox Kintner Plotkin & Kahn, PLLC

(57) ABSTRACT

A supporting mechanism is provided to be moved between a disc insertion opening and a disc storing device, and a driving roller is rotatably mounted on the supporting mechanism for carrying a disc inserted in the opening toward the disc storing device. The supporting mechanism is moved between the opening and the disc storing device, and the driving roller is driven for carrying the disc from the opening to the disc storing device.

9 Claims, 28 Drawing Sheets

APPARATUS FOR REPRODUCING AN OPTICAL DISC

BACKGROUND OF THE INVENTION

The present invention relates to a device for reproducing an optical disc selected from a plurality of discs stored in a disc storage, and more particularly to a disc reproducing device mounted on a motor vehicle.

In recent years, a disc reproducing device in which a disc can be changed through an opening for inserting a disc to be reproduced has been proposed.

FIG. 28 shows a disc reproducing device, which was filed by the applicant and disclosed in Japanese Patent Application Laid Open 10-21628.

In the figure, the reference numeral 500 represents a driving roller, 501 is a disc storing section, 502 is a tray, 503, 504 are disc pulling out arms, 505, 506 are coil springs, and 507 is a disc discharging arm.

The driving roller 500 is driven by a motor (not shown) to carry a disc inserted passing through an opening to the disc storing section 501. In the disc storing section 501, a plurality of trays, each holding a disc, are arranged. A desired tray is located to a position corresponding to the driving roller 500 for changing the disc. There is provided a disc carrying device (not shown) between the disc storing section 501 and a disc reproducing section (not shown).

The disc pulling out arm 503 is rotatable about a shaft 503a and has a contact portion 503b to be contacted with a periphery of disc D, and urged in the clockwise direction by the spring 505. Similarly, the disc pulling out arm 504 is rotatable about a shaft 504a, has a contact portion 504b, and urged in the counterclockwise direction by the spring 506. The disc discharging arm 507 is located so as to be contacted with the disc.

Before the inserting of the disc, the arms 503 and 504 are located in positions A. When the disc is taken in by the driving roller 500, arms 503 and 504 are rotated to positions B. However, the arms 503 and 504 push the disc, thereby removing the disc from the driving roller 500 and inserting the disc in the tray 502. When discharging the disc, the discharging arm 507 is rotated to the position A to push the disc to the driving roller 500.

In the conventional device, arms 503, 504 and 507 must be provided in order to carry the disc. Therefore, the device is complicated in construction, which results in high manufacturing cost.

SUMMARY OF THE INVENTION

An object of the present invention is to provide a disc reproducing device which is simple in construction and has high reliability.

According to the present invention, there is provided an apparatus for reproducing an optical disc comprising, a disc reproducing device, a disc storing device having a plurality of trays each of which stores a disc, a supporting means movable between a disc insertion opening and the disc storing device, a driving roller rotatably mounted on the supporting means for carrying a disc inserted in the opening toward the disc storing device, moving means for moving the supporting means between the opening and the disc storing means, and driving means for rotating the driving roller.

The disc reproducing device is mounted on the supporting means.

Furthermore, a movable plate is provided for cooperating the driving roller so as to carry the disc, and an erectable stopping member provided adjacent the opening to be stood when the driving roller is located at the disc storing device so as to prevent a disc from entering the apparatus.

The trays are vertically arranged, and moved in the arranging direction.

The disc reproducing device is located between the driving roller and the disc storing device.

The driving roller is provided for carrying the disc between one of the trays and the disc reproducing device.

These and other objects and features of the present invention will become more apparent from the following detailed description with reference to the accompanying drawing.

BRIEF DESCRIPTION OF DRAWINGS

FIGS. 11a to 12c show a supporting chassis moving mechanism;

DETAILED DESCRIPTION OF THE PREFERRED EMBODIMENT

An embodiment of the present invention is described with reference to the drawings.

Figure 1:
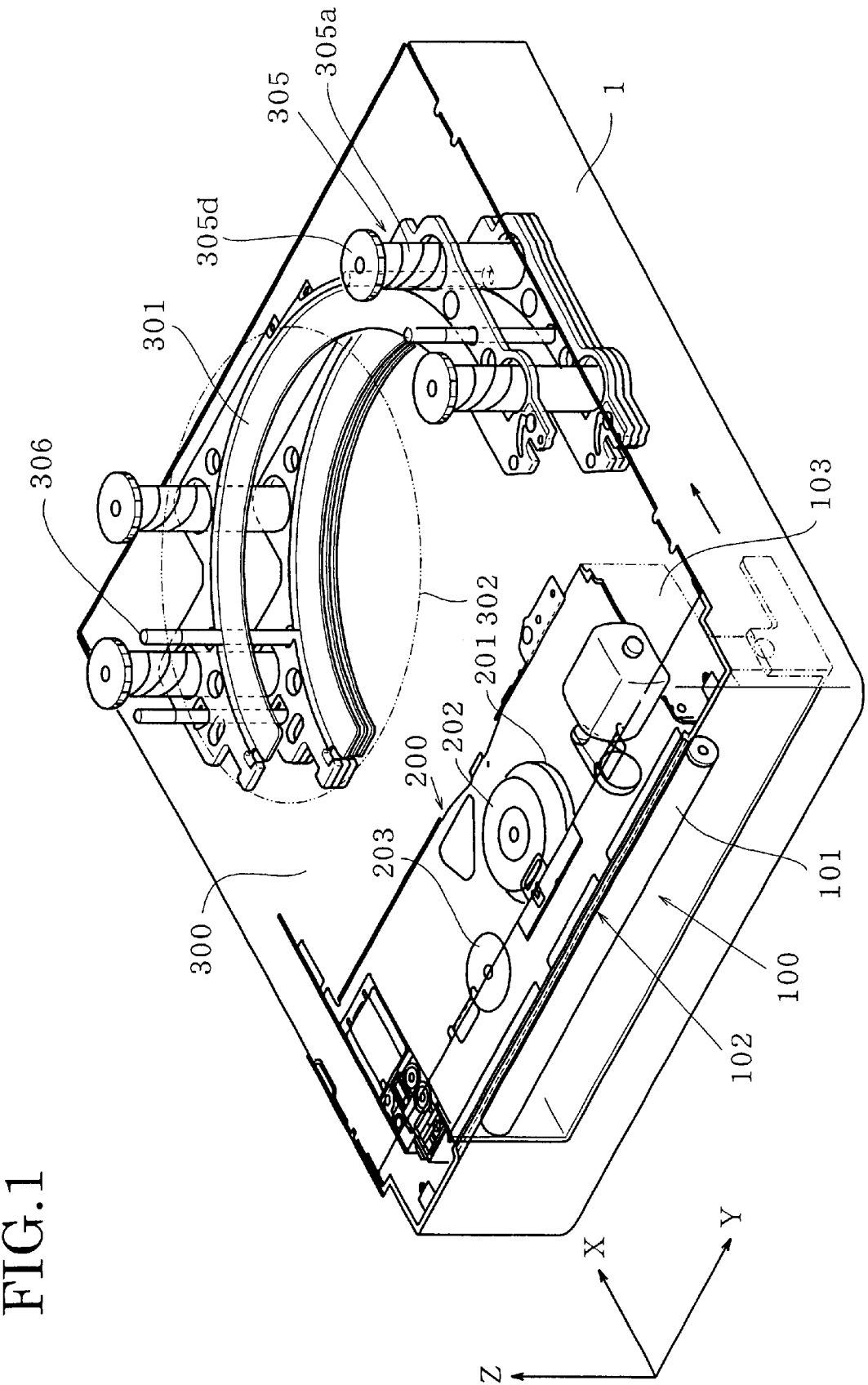
FIG. 1 is a perspective view showing an embodiment of the present invention.
Figure 2:
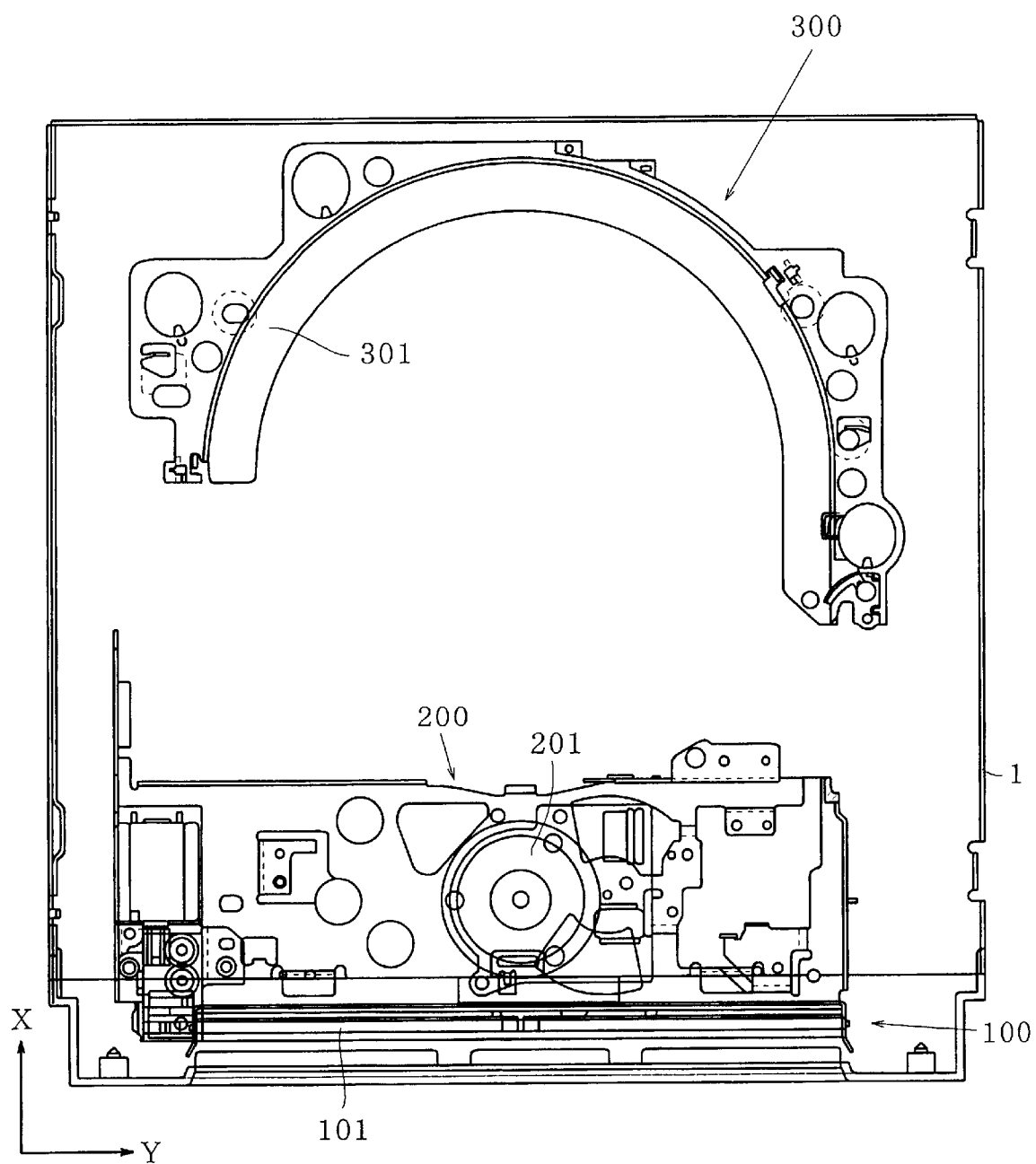
FIG. 2 is a plan view showing the embodiment of the invention.

FIG. 1 is a perspective view showing the apparatus of the present invention, and FIG. 2 is a plan view of the apparatus. The apparatus of the invention comprises following three portions provided in a chassis 1. Namely, there is provided a disc carrying device 100 provided with a driving rollers 101, a disc reproducing device 200 having a turntable 201, and a pickup 203, and a disc storing device 300 having trays 301, storing discs in the direction of the arrow z in FIG. 1.

The disc carrying device 100 carries a disc inserted by a user from a disc insertion opening of a front panel to the disc reproducing device 200 or the disc storing device 300, and discharges a large diameter disc 302 from the disc reproducing device 200 or the disc storing device 300.

The driving rollers 101 contact with the lower side of a disc inserted into a disc carrying passage 102 through the insertion opening, and carry the disc in the direction x. A supporting chassis 103 supporting the driving rollers 101 is provided to be moved in the direction x by a supporting chassis moving mechanism described later. Therefore, the disc is carried in the direction x by the movement of the supporting chassis 103.

The disc reproducing device 200 is composed of a turntable 201 provided at the underside of the disc 302, a damper 202 for clamping the disc in cooperation with the turntable 201 provided at the upper side of the disc, a pickup 203, and a pickup feed mechanism for moving the pickup 203 in the radial direction of the disc.

As illustrated, the disc reproducing device 200 is supported on the supporting chassis 103 at the disc storing device 300 side rather than the disc carrying device 100. Due to the disposition, the disc reproducing device 200 can be moved together with the disc carrying device 100 in the direction x. Since the space between the turntable 201 and the clamper 202 is communicated with the disc carrying passage 102 in the non-clamping state, the disc to be fed in by the driving rollers 101 can be passed through the space.

As shown in FIG. 10a, the clamper 202 is supported in a state where it cannot be moved relative to a clamper base 205, a clamping operation and an unclamping operation for the disc are performed by raising and lowering the turntable 201 in the direction z (FIG. 1) by means of an unillustrated clamping mechanism.

The disc storing device 300, which is composed of four trays 301 arranged in the direction z, is provided for storing four discs. There is provided with a tray carrying device for carrying the tray 301 in the direction z. The tray carrying device includes a driving shaft 305.

Figure 3:
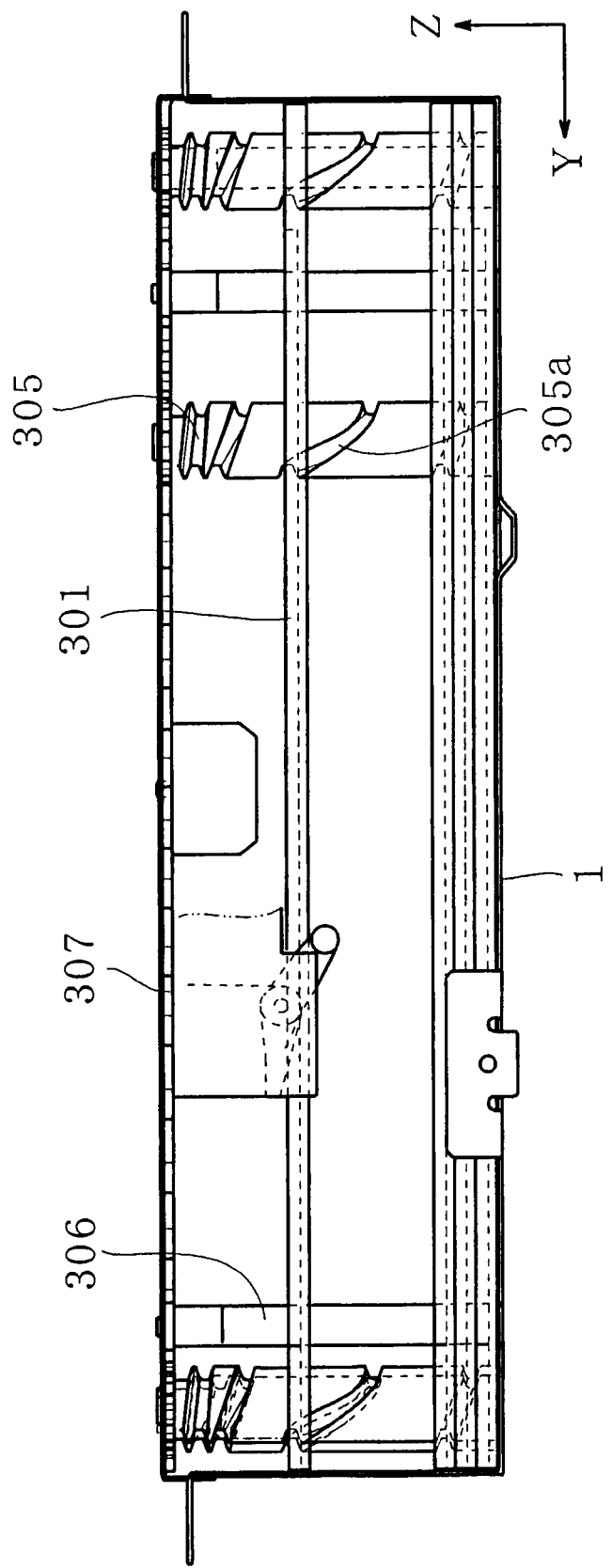
FIG. 3 is a side view.
Figure 4:
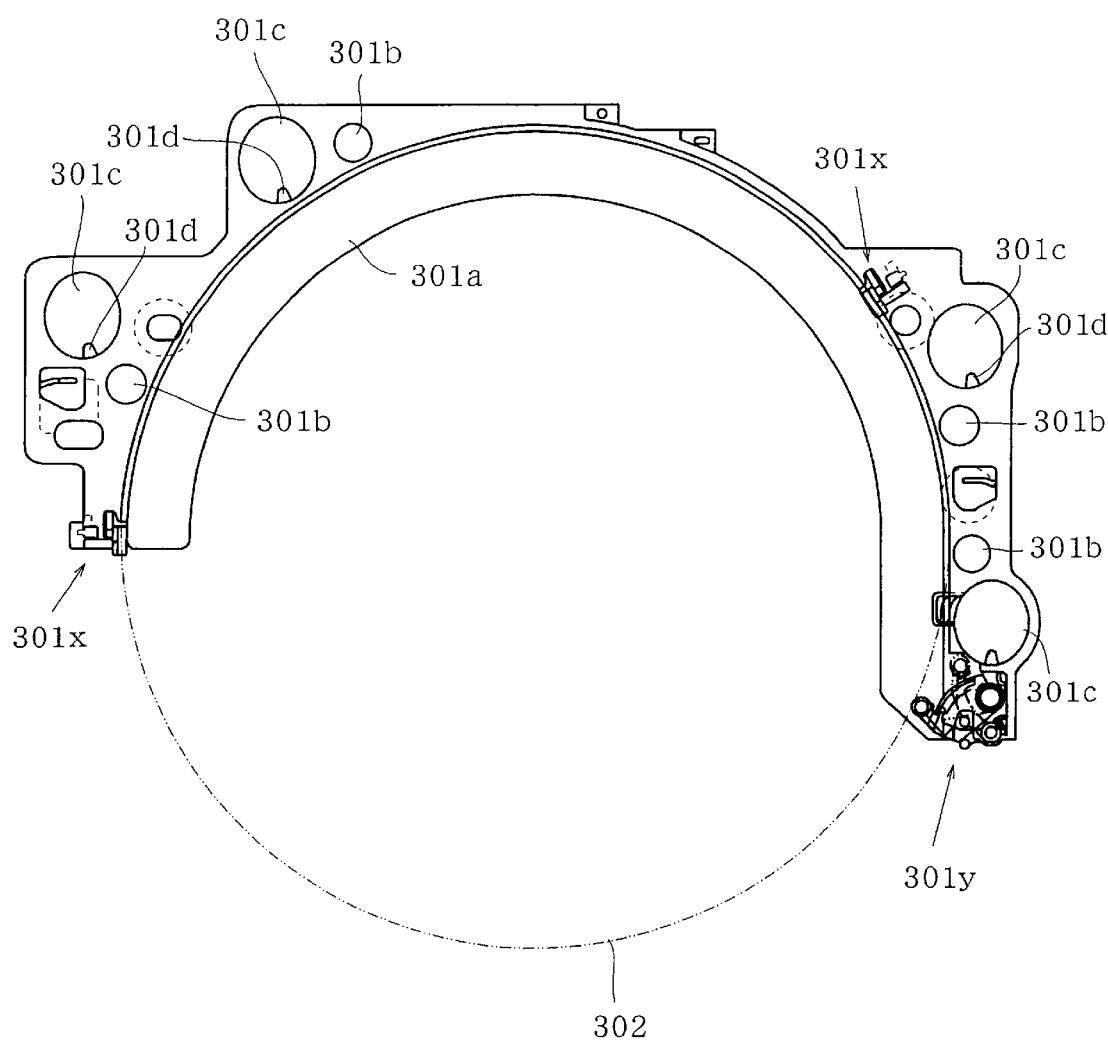
FIG. 4 is a plan view.

FIG. 3 is a rear view of the disc storing device 300. The reference numeral 301 designates a tray, 305 is a driving shaft, 306 is a guide shaft, and 307 is a synchronizing gear. FIG. 4 is a plan view showing the tray 301. The tray has a semicircular annular shape having a diameter slightly larger than that of the disc 302. The tray has a disc holding surface 301a, guide holes 301b, driving shaft inserting holes 301c, and engaging projections 301d. A disc face holding mechanism 301x and a disc edge holding mechanism 301y are provided as mechanisms for holding the disc on the tray. The four trays are all the same in construction.

As shown in FIG. 3, the four guide shafts 306 (only two shafts are shown in FIG. 3) are secured on the main chassis 1 in the direction z, and these shafts are inserted in the guide holes 301b. Thus, the tray 301 is regulated in movement so as to be moved in the direction z.

The four driving shafts 305 (only three shafts are shown in FIG. 3) are rotatably supported on the main chassis 1. Each of the driving shafts 305 has a helical groove and is inserted in the driving shaft inserting hole 301c, The engaging projection 301d of each tray is engaged with the helical groove 305a. The engaging projections 301d of four trays are positioned at every one pitch of the herical grooves 305a. The four driving shafts 305 are rotated by a synchronously driving mechanism in synchronism with each other as described hereinafter. Thus, the trays 301 are moved in the direction z at the same time by rotating the driving shafts 305.

Figure 5:
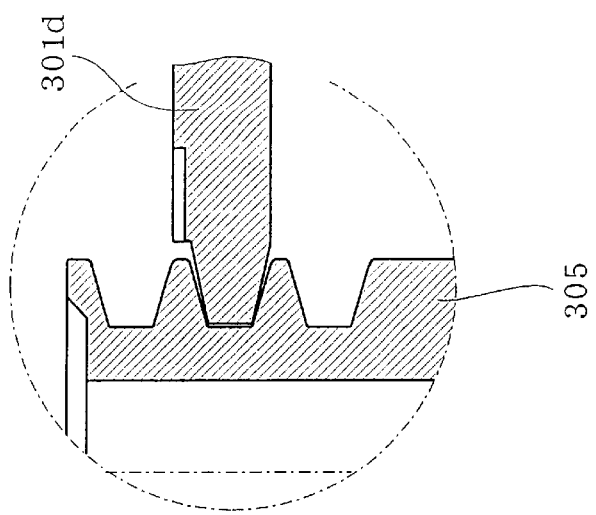
FIG. 5a is a side view showing a driving shaft.
FIG. 5b is a sectional view of the driving shaft.
FIG. 5c is an enlarged view of a part of FIG. 5b.
FIG. 5d is a plan view of the shaft.
Figure 5:
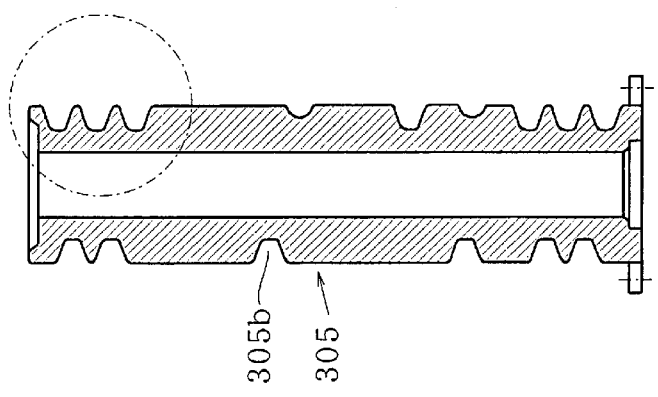
Figure 5:
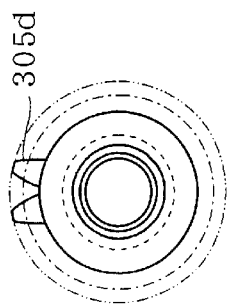
Figure 5:
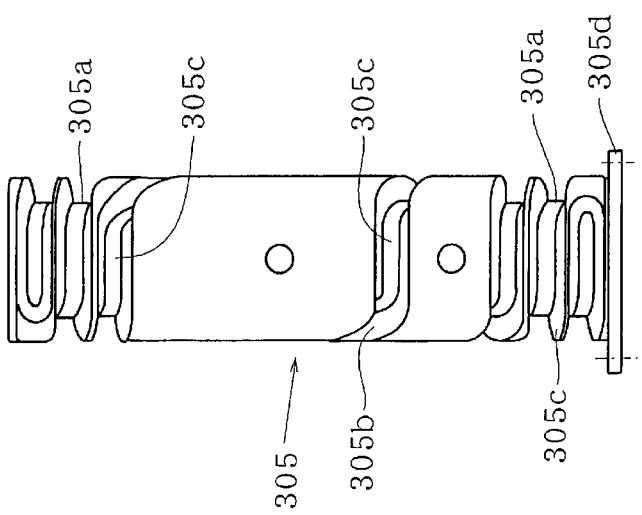

FIGS. 5a–5c show the driving shaft 305.

As shown in FIGS. 5a and 5b, grooves 305a of an upper end portion and a lower end portion of the driving shaft 305, have small and constant pitches and has a large pitch at a middle portion 305b. Therefore, the tray the engaging projection 301d of which engages with the middle portion 305b of the groove 305a is positioned apart from other trays as shown in FIG. 3. The helical groove 305a at the middle portion 305b of the groove 305a is located at the same height as the disc to be reproduced by the disc reproducing portion.

Furthermore, the height is also a height of a disc to be inserted in one of the trays.

Namely, the middle portion 305b is positioned at the height of the disc reproducing position of the disc player, and also at the height of the disc to be inserted in one of the trays by the carrier.

Namely, when the disc is stored into the disc storing device 300, the tray is positioned at the height, and similarly when the disc is discharged from the disc storing device, the tray is positioned at the height. The reproducing device 200 can be positioned at the space formed between trays 301.

A flat groove portion 305c is formed in a range at every one pitch in each of the grooves 305a at the upper and lower portions and the middle portion 305b. Thus the tray is prevented from deviating from the position in the direction z even if the timing for stopping the rotation of the driving shaft 305 deviates.

Since both sides of the engaging projection 301d of the tray is tapered as shown in FIG. 5c, the projection smoothly slides in the groove 305a of the driving shaft 305.

Figure 6:
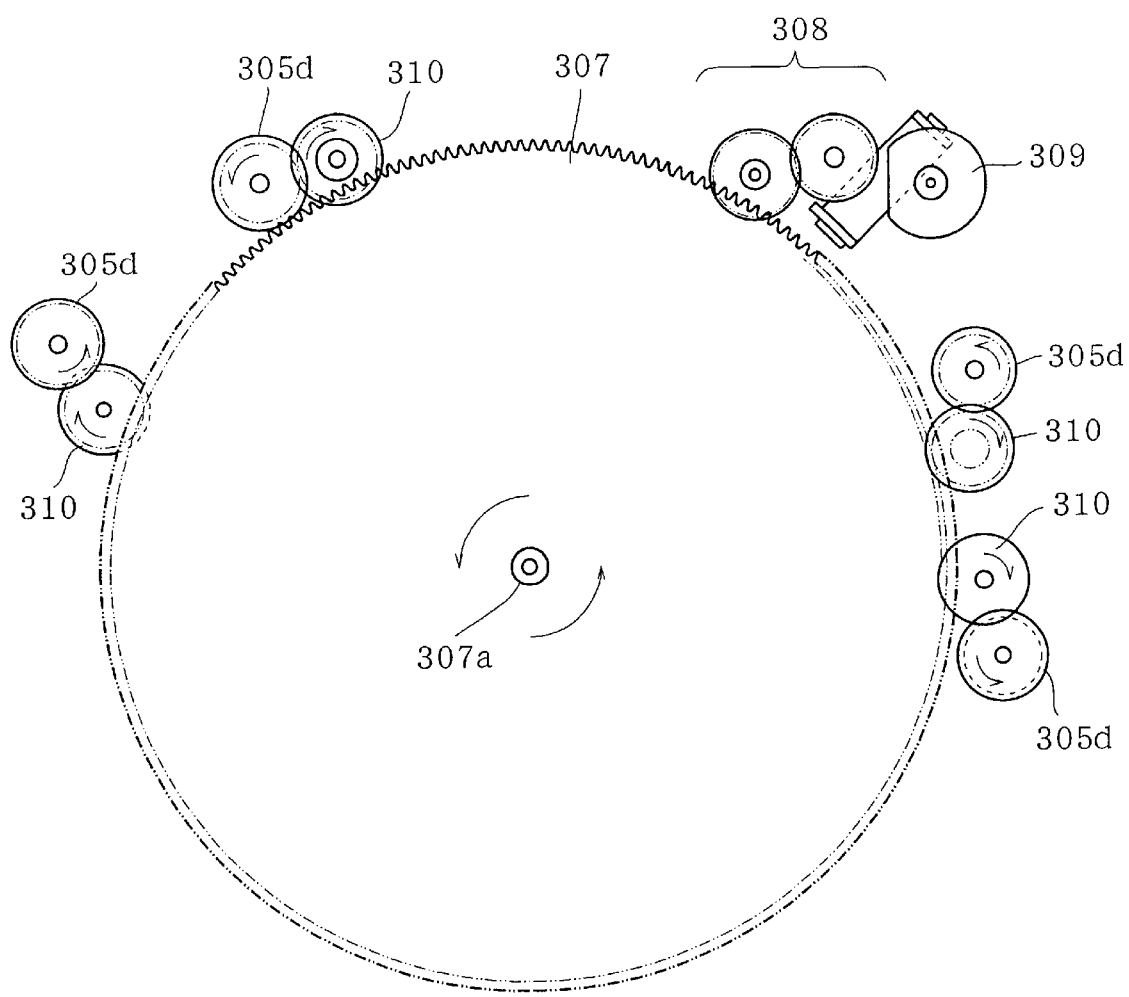
FIG. 6 is a plan view showing a driving mechanism for the driving shaft.

FIG. 6 shows a mechanism for synchronously driving the four driving shafts 305. A synchronizing gear 307 is rotatable in the chassis 1, and provided to be rotated about a shaft around a fulcrum 307a. The synchronizing gear 307 is rotated by driving force of a motor 309 transmitted through a transmitting mechanism 308. Transmitting gears 310 are engaged with the synchronizing gear 307 and each of the transmitting gears 310 is engaged with a gear 305d formed on the upper end of the driving shaft 305. Accordingly, the rotation of the synchronizing gear 306 is transmitting through each transmitted gear 310 to each driving shaft 305, and hence the four driving shafts 305 are rotated synchronously with one another in the same direction.

Figure 7:
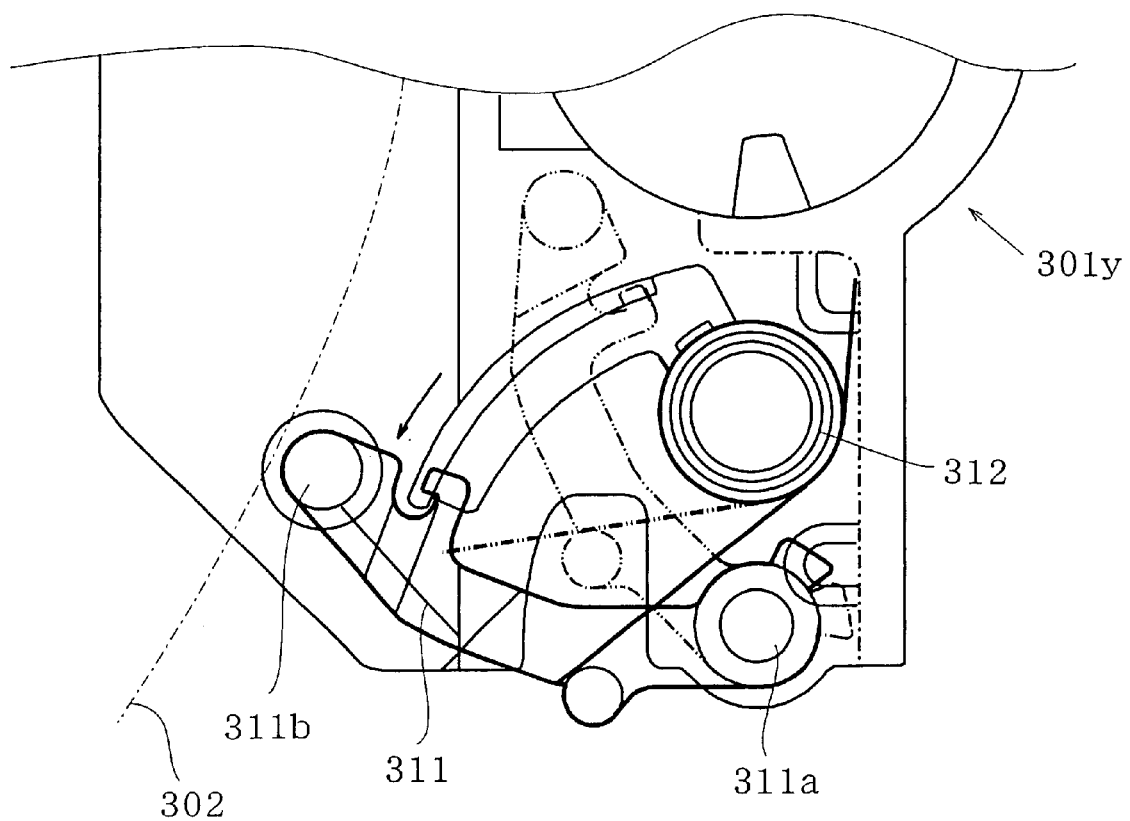
FIG. 7 is a plan view showing a disc holding device.

FIG. 7 is an enlarged view of the disc edge holding mechanism 301y of the tray 301 shown in FIG. 4. A disc holding arm 311 is provided at a position adjacent the tray 301 so as to be rotated about a shaft 311a. The arm 311 is urged by a coil spring 312 in the arrow direction in the figure so that an end portion 311b of the arm 311 pushes the outer edge of the disc 302 to prevent the disc from deviating in the discharging direction by external force.

The end portion 311b engaged with the edge of the disc 302 is positioned at a position outside a line connecting the shaft 311a and the center of the disc (at the discharging direction side of the disc). Since the disposition provide a sufficient disc holding force even if the coil spring 312 has a small elastic force, the disc holding arm 311 can be reduced in size.

Figure 8:
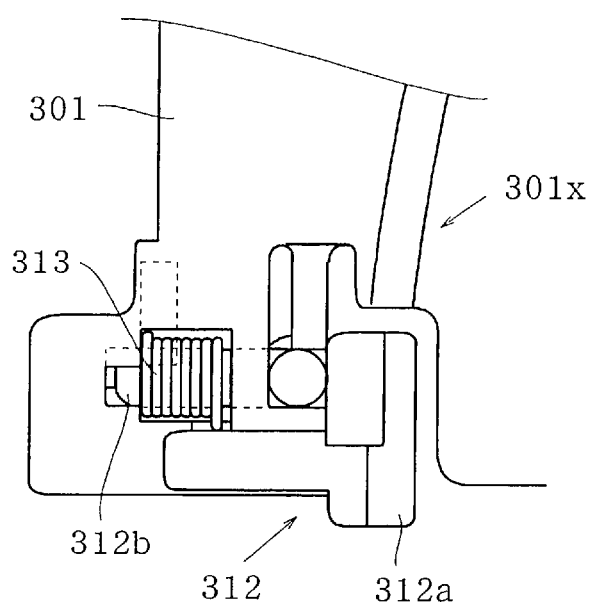
FIGS. 8a to 8c show a disc holding mechanism showing an embodiment of the invention.
Figure 8:
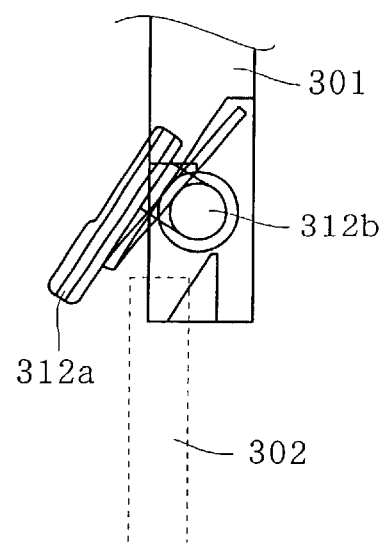
Figure 8:
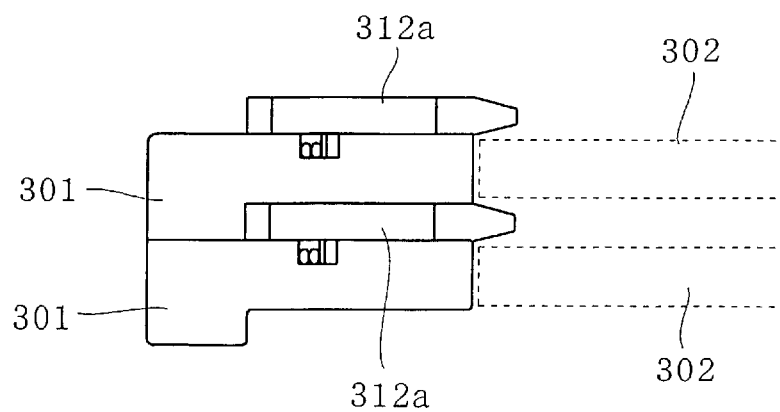

Referring to FIGS. 8a to 8c showing the disc holding mechanism 301x of the tray 301 shown in FIG. 4, a disc holding member 312 is composed of a holding portion 312a and a supporting shaft 312b. The holding portion 312a can be rotated about the supporting shaft 312b. The supporting shaft 312b is urged by a coil spring 313 in the arrow direction in FIG. 8b. Since the upper face of the disc 302 carried toward the tray 301 is pressed by an end portion of the holding portion 312a, the disc is prevented from vibrating in the vertical direction due to external force.

As shown in FIG. 8c, in the case that a plurality of trays 301 are stored, since the underside of the tray at the upper side pushes an end portion of the tray holding portion 312a of the tray at the lower side, the urging force of the coil spring 313 is released. However, since the holding portion 312a projects above the disc, the disc is not removed from the space.

Figure 9:
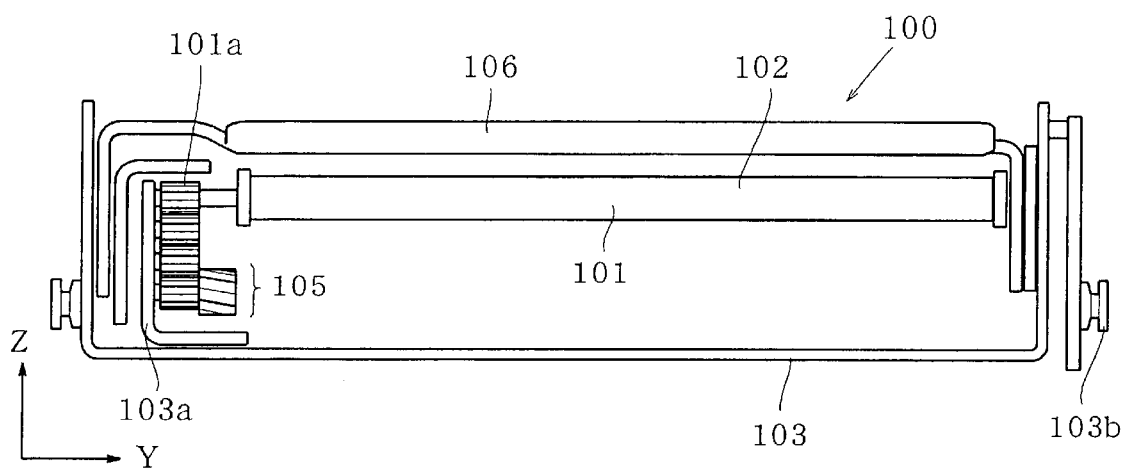
FIGS. 9a and 9b show a disc carrying portion showing an embodiment of the invention.
Figure 9:
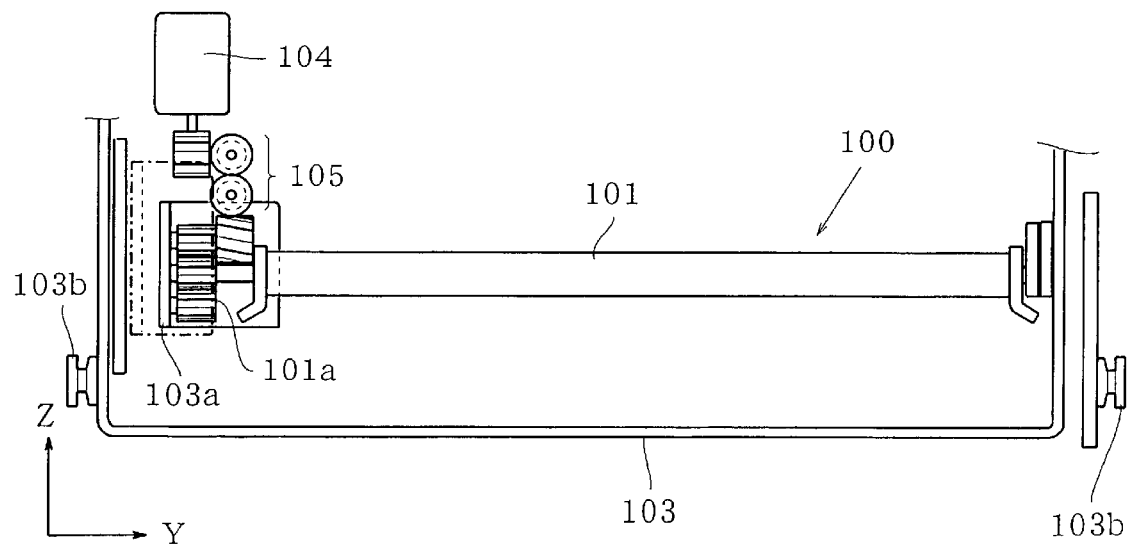

FIGS. 9a and 9b show the disc carrying device 100. A motor 104 and a transmitting mechanism 105 composed of a plurality of pinions are supported on the supporting chassis 103. The driving roller 101 has a pinion 101a coaxially formed at an end thereof, and is rotatably supported on the supporting chassis 103 at an upright portion 103a of the supporting chassis 103 and the other end is supported on the supporting chassis 103. The pinion 101a of the driving roller 101 is engaged with the pinion of the transmitting mechanism 105. Therefore, the driving force of the motor 104 is transmitted to the driving roller 101.

A pair of guide projections 103b are projected from the left and right sides of the supporting chassis 103. The guide projections are guided in the direction x.

A movable plate 106 is provided to form the disc carrying passage 102 together with the driving roller 101. The disc carrying passage 102 is formed so that the disc can be held by the driving roller 101 and the movable plate 106. A protective cloth is attached on the underside of the movable plate 106 so that the disc is not scratched. The movable plate 106 is supported by a guiding mechanism (not shown) so as to be movable in the direction z relative to the supporting chassis 103. Additionally, the movable plate 106 can be moved together with a clamping mechanism of the disc reproducing device 200.

More specifically as shown in FIGS. 10a and 10b, when the turntable 201 is lowered, the movable plate 106 is located at a position where the disc carrying passage 102 is formed in cooperation with the driving roller 101 as shown in FIG. 10a. However, when the turntable 201 is raised and clamps the disc 302, as shown in FIG. 10b, the movable plate 106 is also raised together with the turntable. Thus, the disc is prevented from touching the movable plate 106 at the time of the clamping of the disc.

A disc diameter determining sensor (not shown) is provided adjacent the driving roller 101. The sensor determines whether an inserted disc is a large-diameter disc (12 cm CD) or a small-diameter disc (8 cm CD).

FIGS. 11a to 13 show a supporting chassis moving mechanism.

A cam gear 2 is rotatably supported by a shaft 2a on the underside of the chassis 1. The cam gear is rotated by a motor (not shown) through a transmitting gear 3. A cam groove 2b is formed in the cam gear 2 so that the distance from the shaft 2a gradually increases.

A pair of guide grooves 4a each having an elongated shape in the direction x are formed at both side portions of a slider 4. A projection 1a provided on the underside of the bottom of the chassis 1 is slidably engaged with each of the guide grooves 4a. Moreover projection 4b, which is provided on a middle portion of the slider 4, is slidably engaged with a guide groove 1b formed in the bottom of the chassis 1 in the direction x. The cam groove 2b of the cam gear 2 is also slidably engaged with the projection 4b.

A pair of upright portions 4c are formed at opposite portions of the slider 4, and a groove hole 4d is formed in each of the upright portions 4c. A linear guide groove 1e is formed in the direction x in each side plate 1d of the chassis 1. Each of the guide projections 103b of the supporting chassis 103 is engaged with the groove hole 4d of the slider 4 and each guide groove 1e of the side plate 1d.

Thus, the movement of the slider 4 is regulated in the direction x. The slider 4 is moved in the direction x when the projection 4b is moved along the groove 1b by the cam groove 2b due to the rotation of the cam gear 2. When the slider 4 is moved, the guide projections 103b are moved in the direction x. Accordingly the supporting chassis 103 is moved in the direction x. As a result, the disc carrying device 100 and the disc reproducing device 200 held on the supporting chassis 103 are moved in the direction x.

Figure 13:
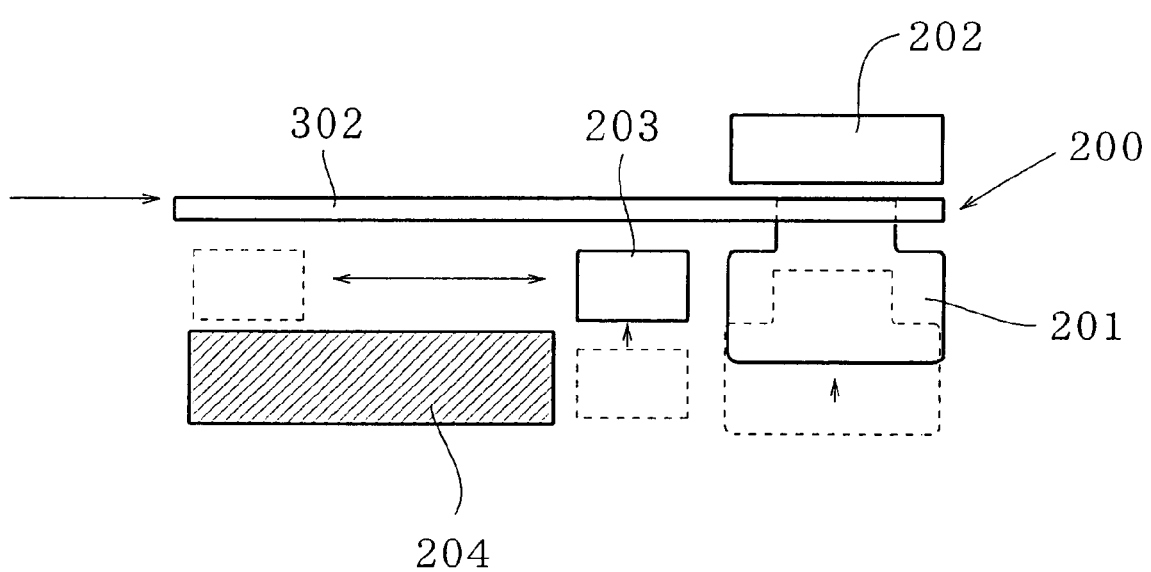
FIG. 13 is a side view showing the turntable and a pickup.

FIG. 13 is a side view of the disc reproducing device 200. As described above, the disc reproducing device 200 clamps and unclamps the disc by raising and lowering the turntable 201, and the pickup 203 is also raised and lowered together with the turntable 201. Since the pickup 203 is lowered at a position near the turntable 201, there is a space 204 in which a printed circuit board, a motor and others can be disposed in the space 204.

The operation of the apparatus of the present invention will be described hereinafter.

The operation for carrying the large-diameter disc (12 cm CD) is described with reference to FIGS. 14 to 20b. FIGS. 14 to 18 are plan views of the apparatus, and FIGS. 19 and 20 are side views.

Figure 14:
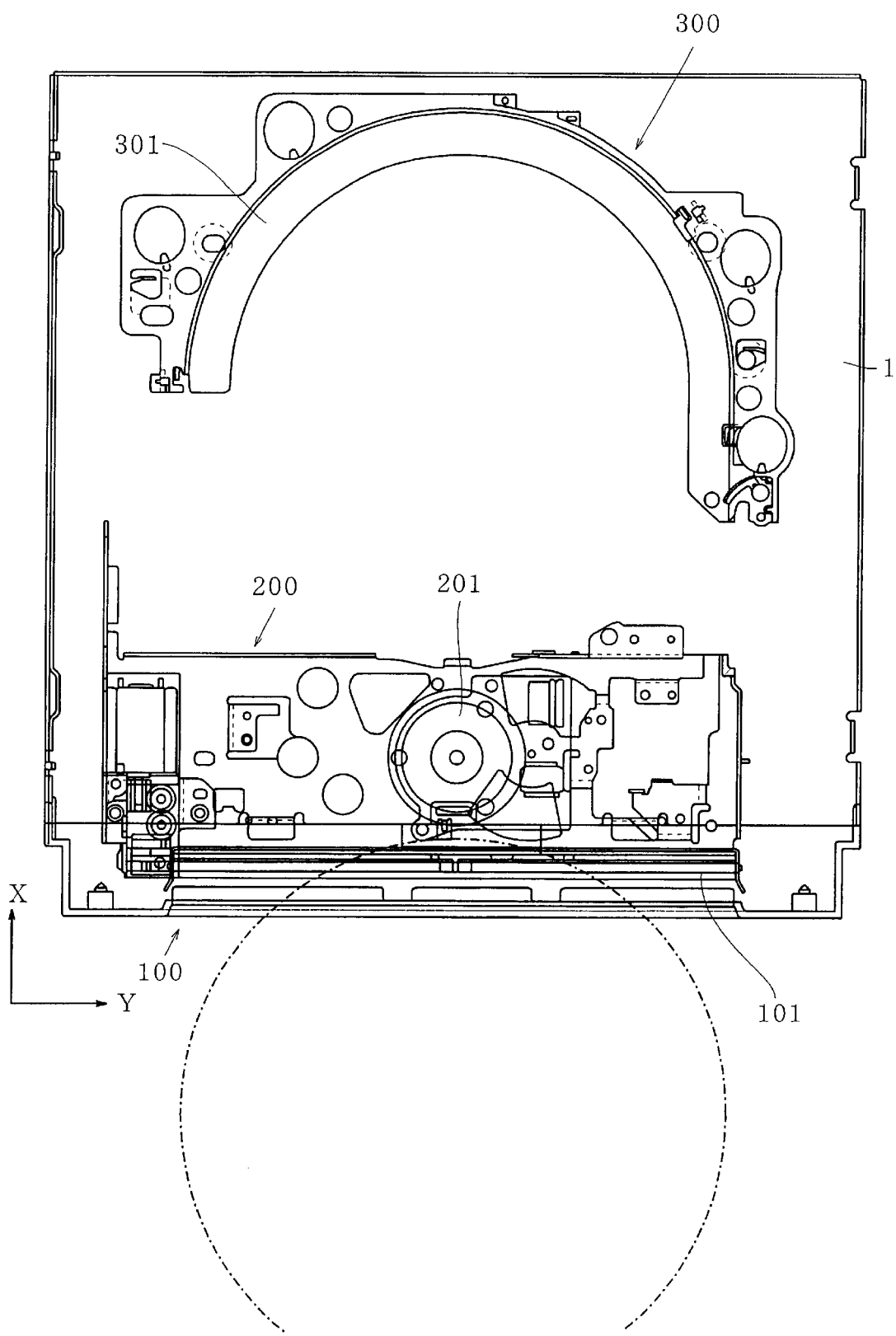
FIGS. 14 to 18 are plan views for explaining the operation of the embodiment of the invention.

The operation for inserting the disc from the outside of the apparatus and carrying the disc to the disc storing device 300 is first described. As shown in FIGS. 14 and 19a, the driving roller 101 is in a waiting state at the insertion starting position. When a user inserts the disc into the disc insertion opening of the front of the apparatus, a sensor detects insertion of the disc, and the driving roller 101 is rotated in the disc carrying direction. The disc is accordingly moved into the apparatus.

Figure 15:
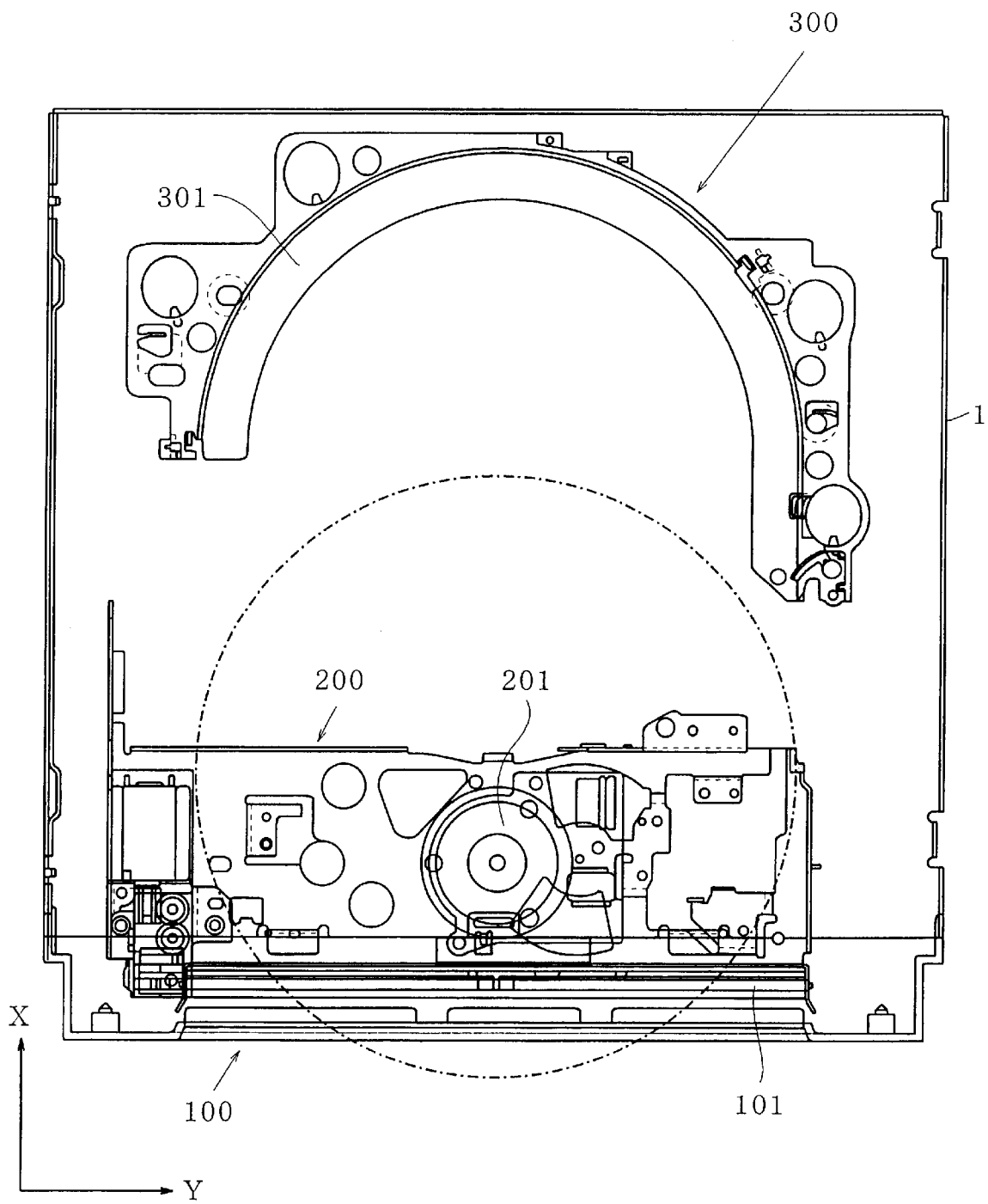

During the moving of the disc, the diameter determining sensor determines the diameter of the disc (12 cm CD). Thereafter the driving roller 101 is stopped. FIGS. 15 and 19b show the state where the driving roller 101 is stopped. At that time, the disc is held by the driving roller 101 and the movable plate 106.

Figure 16:
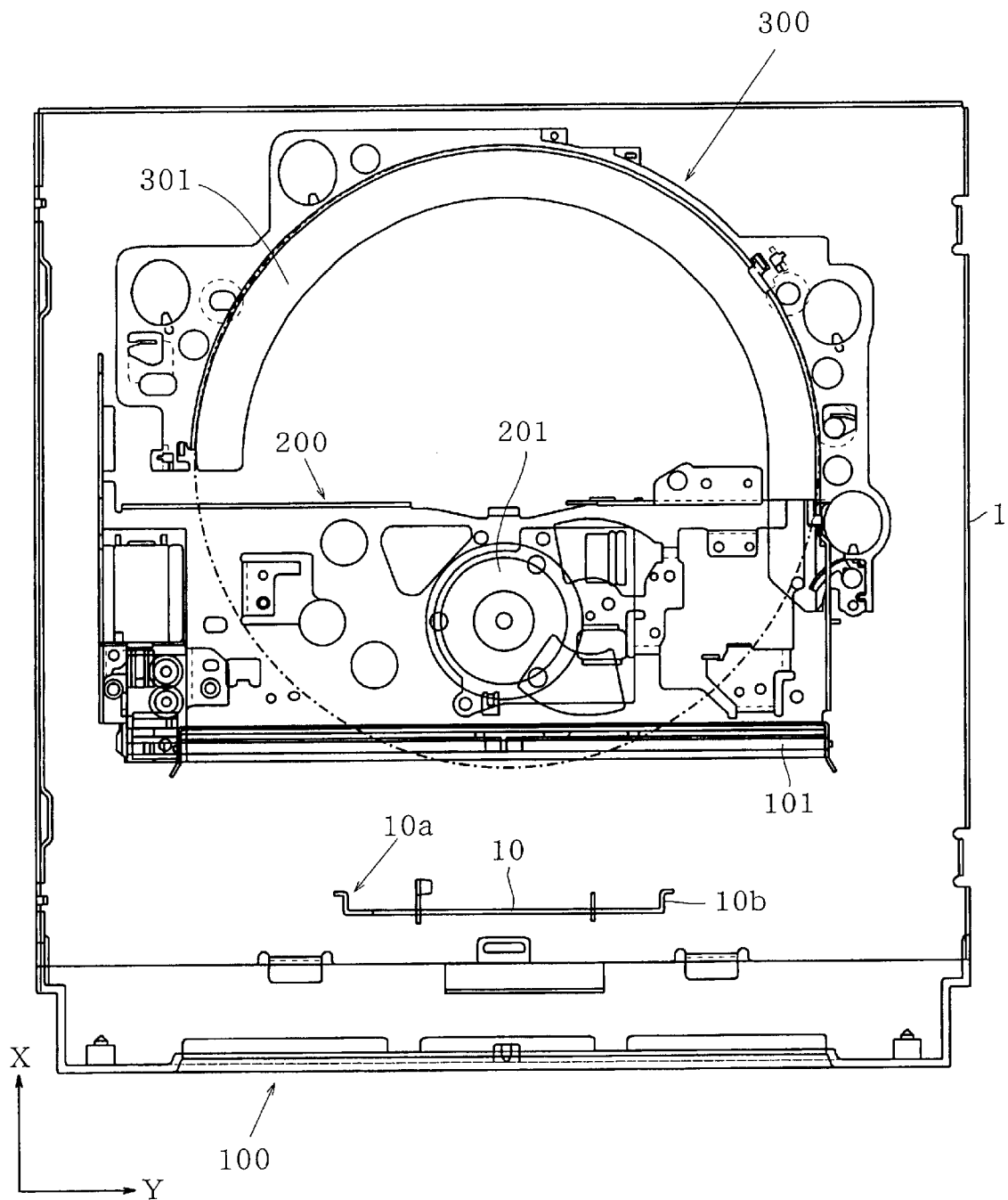

Next, the supporting chassis moving mechanism is driven and the driving roller 101 and the disc reproducing device 200 are moved to the disc storing device 300. As shown in FIGS. 16 and 19c, when the disc is held on the tray 301, the supporting chassis moving mechanism is stopped and the driving roller 101 reaches the disc storing position. Reference numeral 10 designates an erectable stopping member. The member 10 is laid when the supporting chassis 103 is at the disc insertion opening side. When the supporting chassis 103 is moved to the disc storing device 300, the member 10 is stood, thereby preventing an erroneous insertion of a new disc. A pair of disc stoppers 10a are provided on the member 10. The disc stoppers are provided for positioning the center of the disc at the center of the turntable when reproducing.

Figure 18:
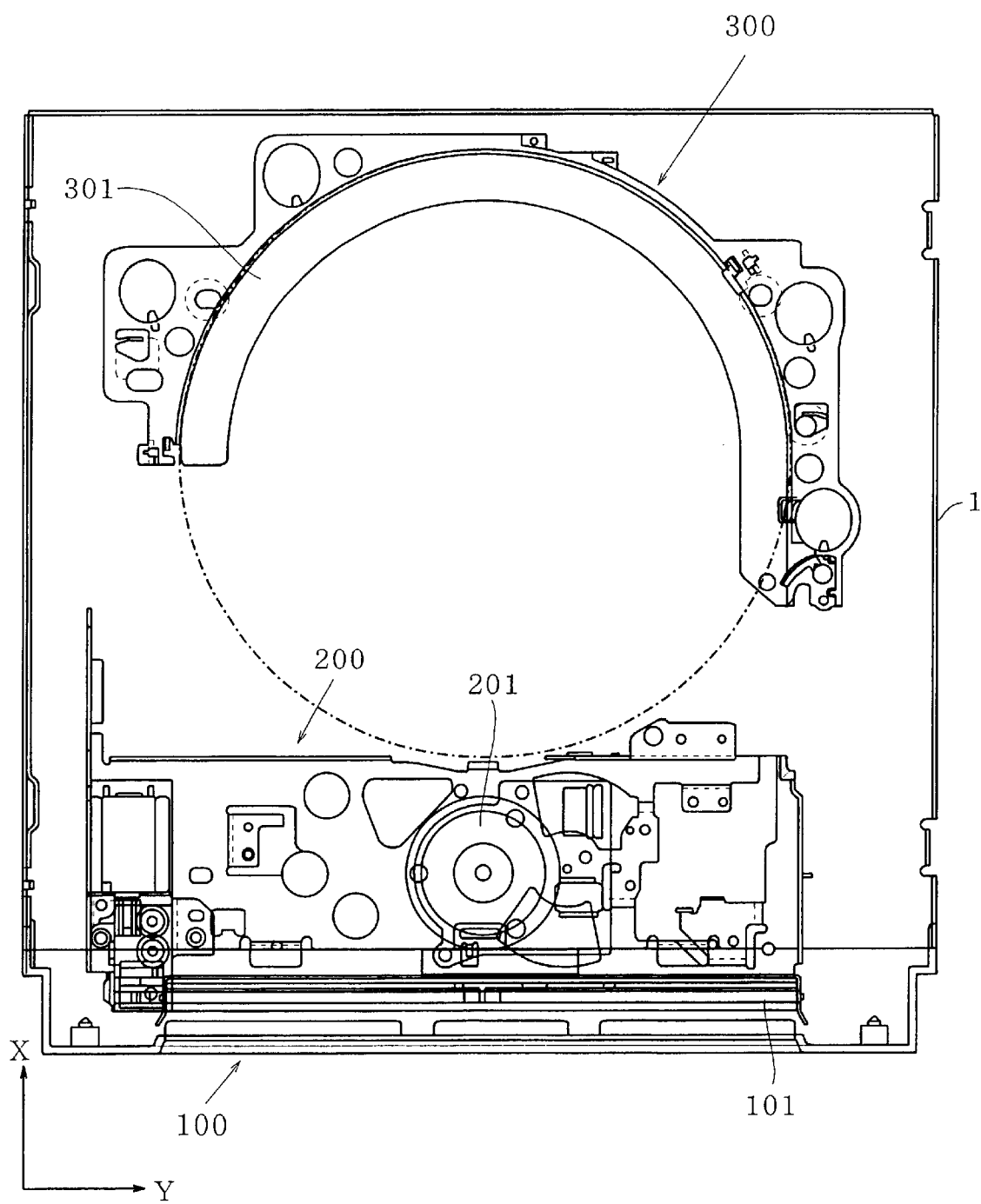
Figure 19A:
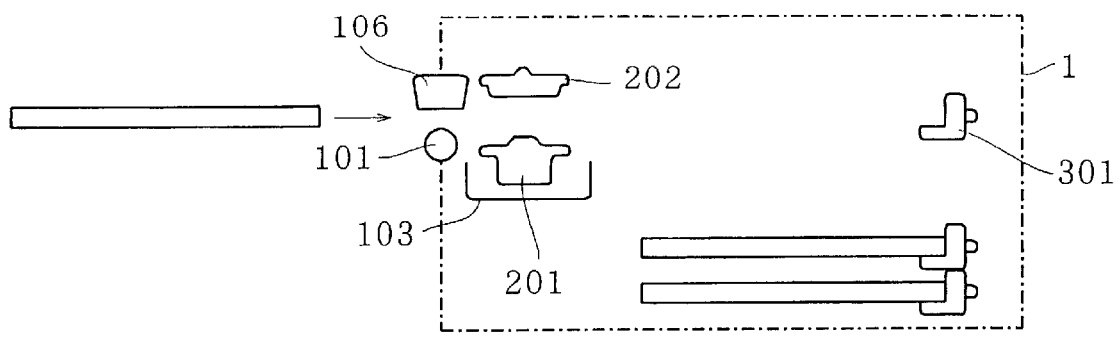
FIGS. 19a to 20b are side views for explaining the operation.
Figure 19B:
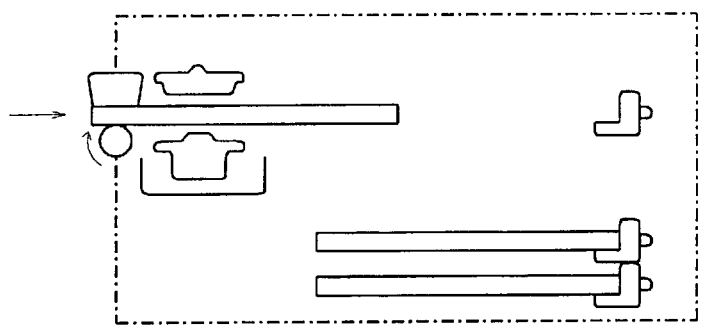
Figure 19C:
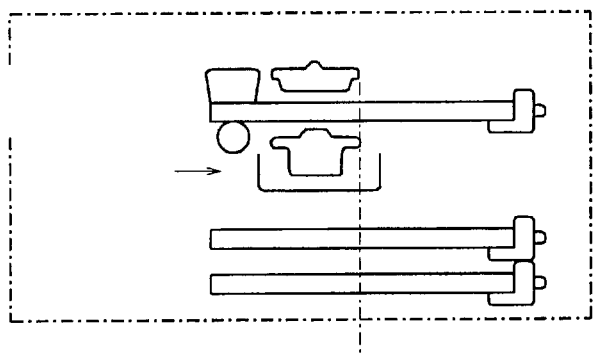
Figure 19D:
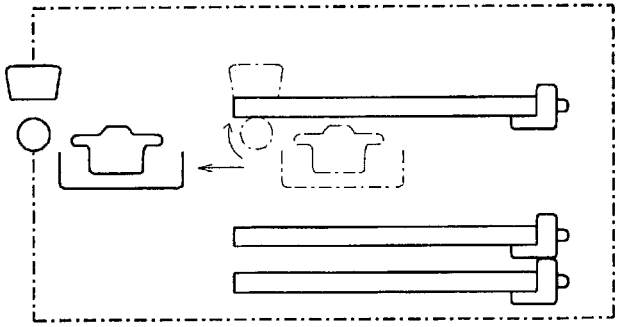

Thereafter, the driving roller 101 is moved back to the disc insertion opening by driving the supporting chassis moving mechanism, while the driving roller is rotated in the disc inserting direction. At that time, since the disc is pushed to the tray due to the rotating of the driving roller 101, only the driving roller 101 is moved back, leaving the disc on the tray 301. As shown in FIGS. 18 and 19d, when the driving roller 101 is moved back to the insertion starting position, the movement of the supporting chassis 103 is stopped.

Thus, the operation of carrying the disc inserted from the outside of the apparatus to the disc storing device is completed.

The operation of the reproducing of the disc inserted from the outside of the apparatus is described. Since the operation from the inserting of the disc to holding the disc on the tray 301, is the same as the above described operation, shown in FIGS. 16 and 19c, description of it is omitted.

After the holding of the disc on the tray, the driving roller 101 is rotated in the disc discharging direction, while the supporting chassis 103 is stopped. Therefore, only the disc is moved back to the insertion opening.

Figure 10:
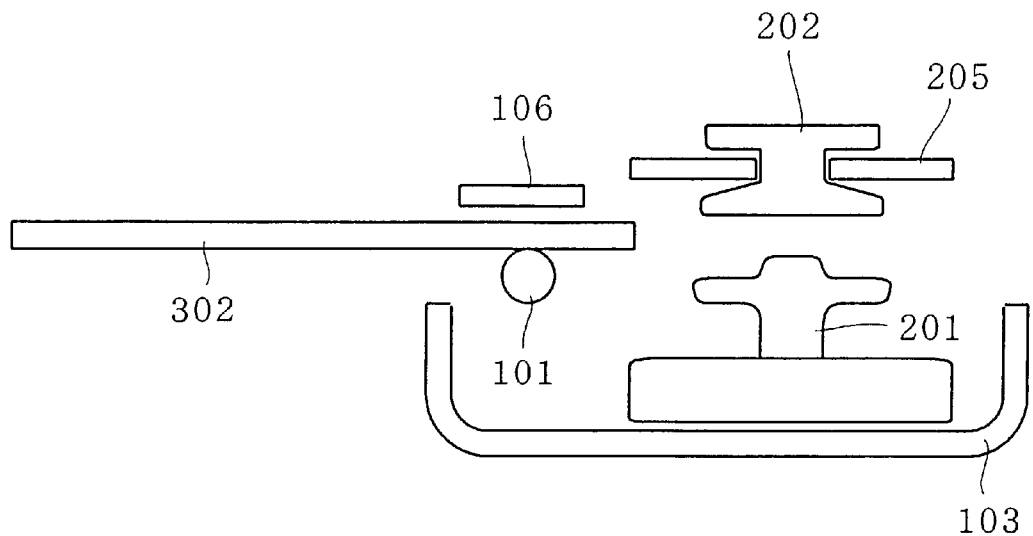
FIGS. 10a and 10b show a turntable and others of the invention.
Figure 10:
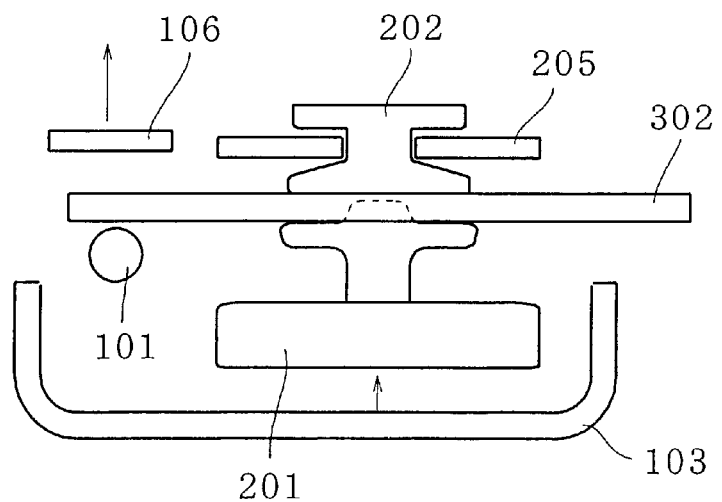
Figure 11:
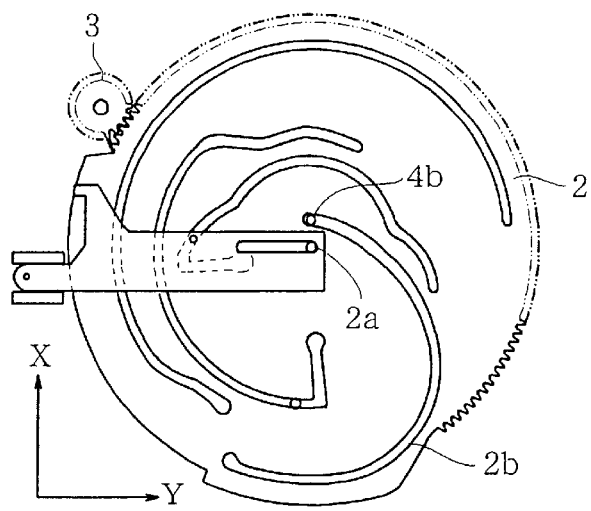
Figure 11:
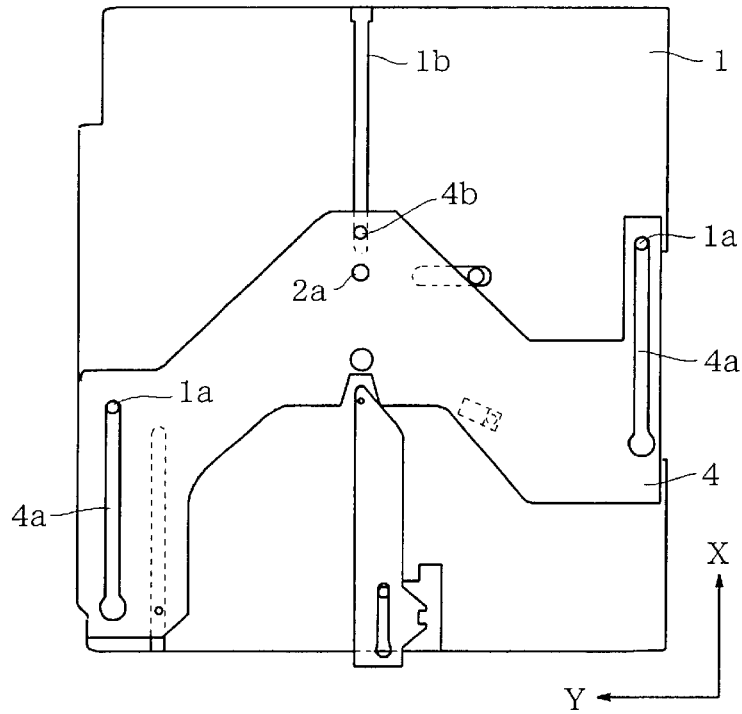
Figure 11:
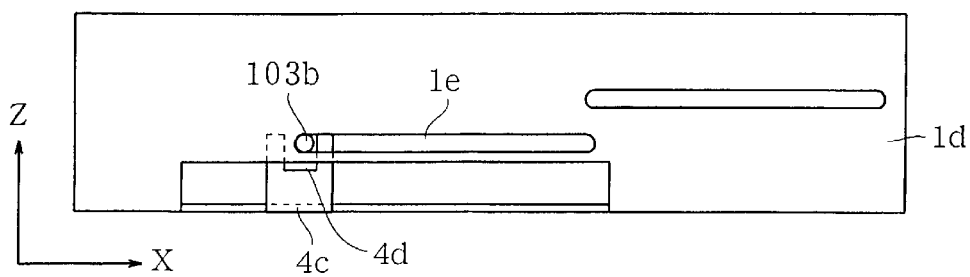
Figure 12:
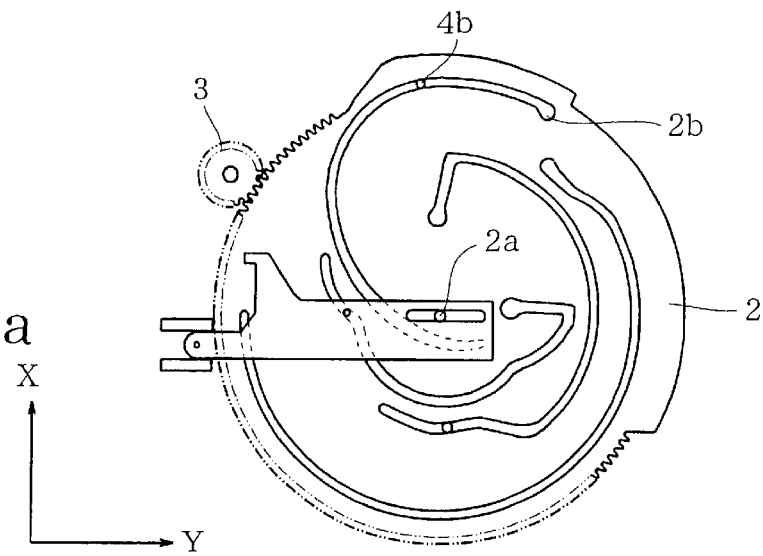
Figure 12:
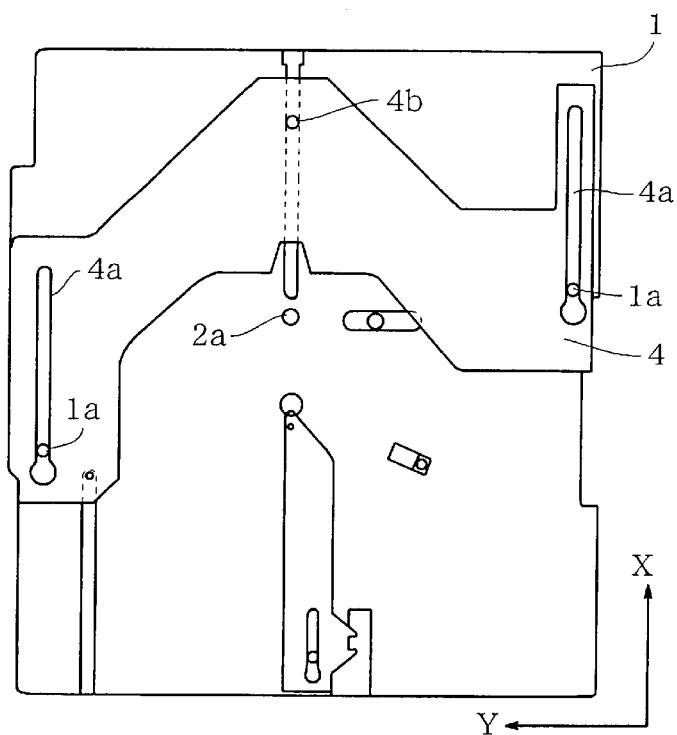
Figure 12:
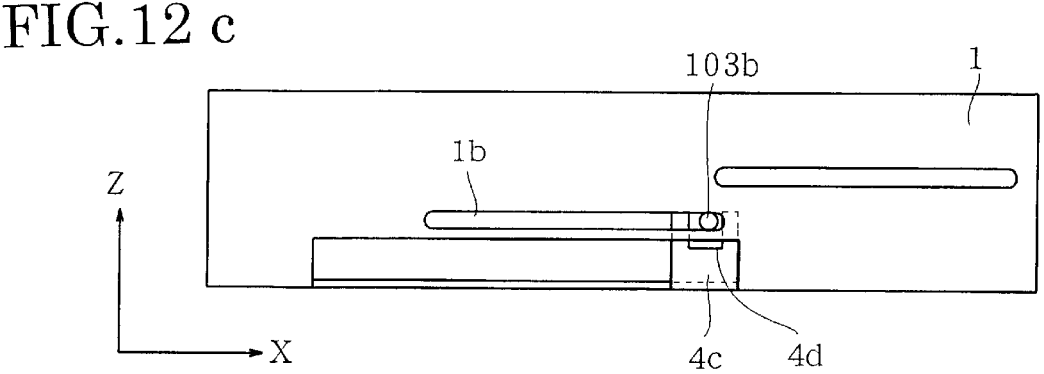
Figure 17:
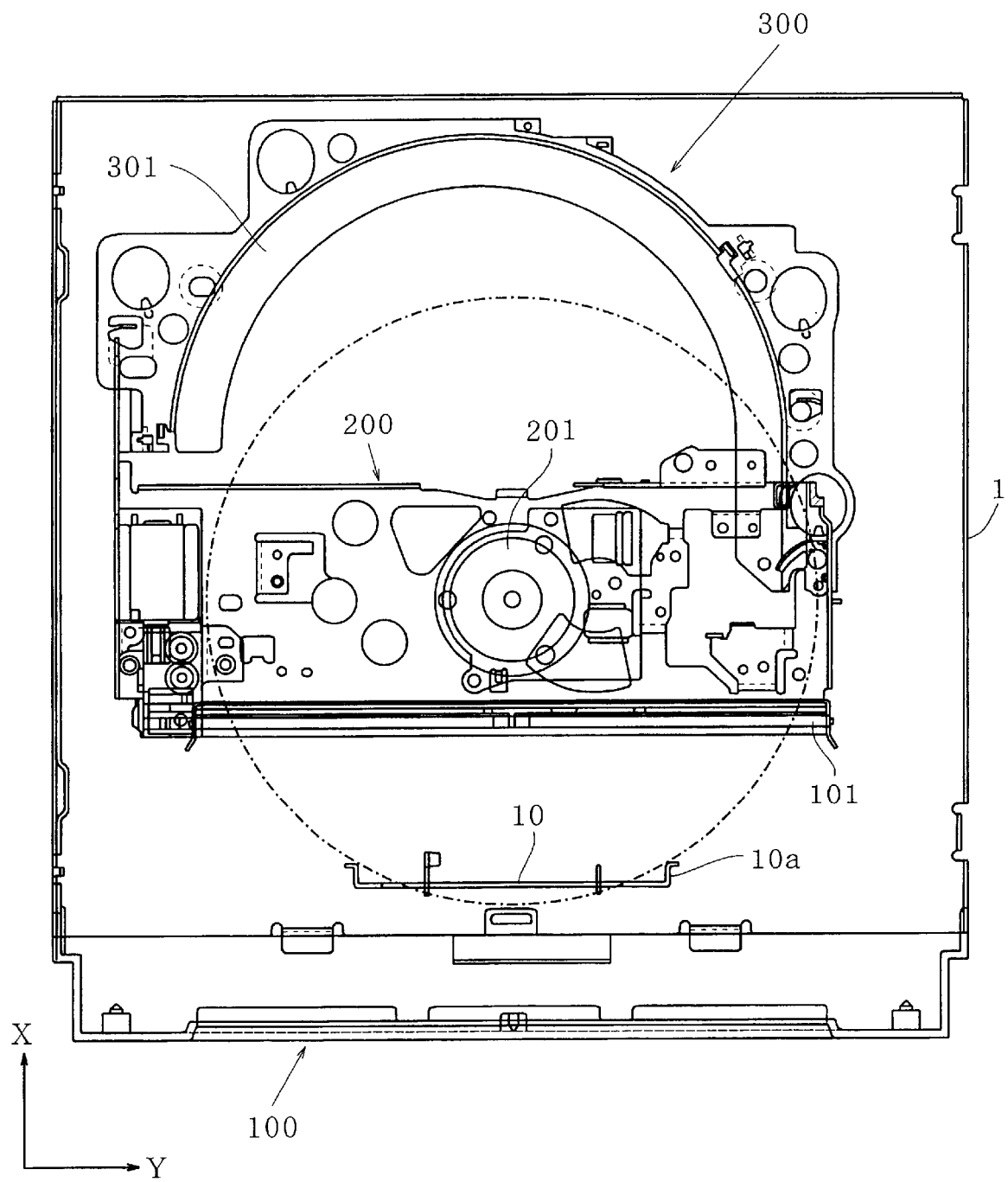
Figure 20A:
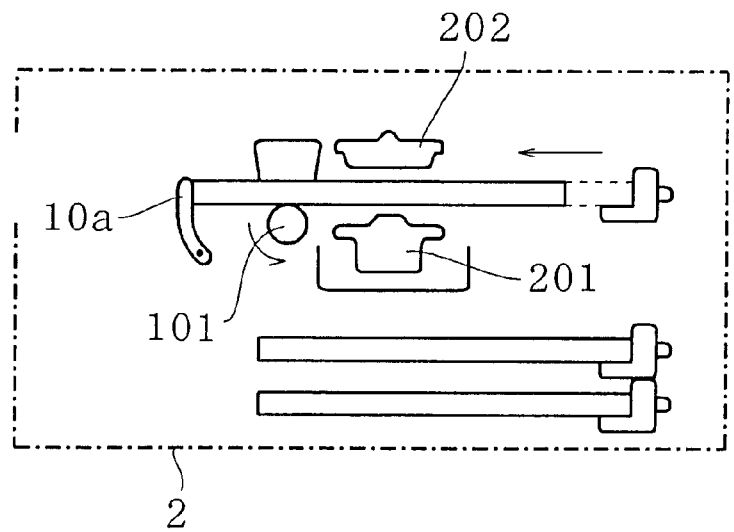
Figure 20B:
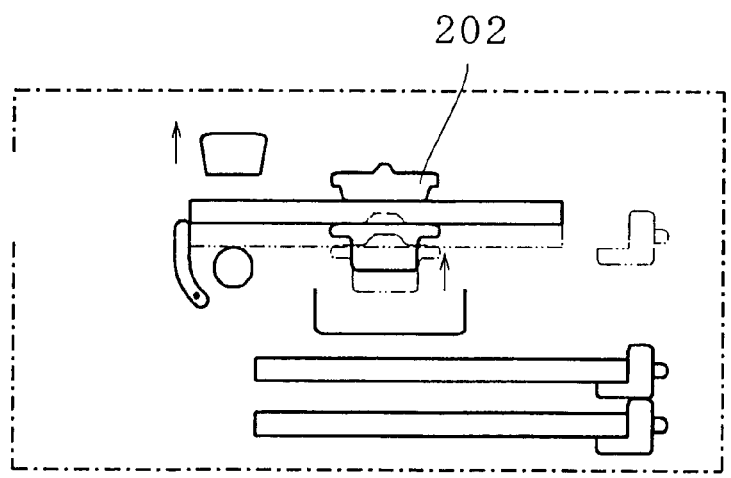

When the disc contacts with disc stoppers 10a of the erected stopping member 10, as shown in FIGS. 17 and 20a, the center of the disc coincides with the center of the turntable 201. Subsequently, the clamping operation shown in FIG. 10 is performed and the disc is reproduced.

Next, the operation of discharging the disc stored in the disc storing device 300 outside the apparatus is described. As shown in FIG. 18, the driving roller 101 is positioned at the insertion starting position. From this state, the driving roller 101 is moved to the disc storing device 300 by driving the supporting chassis moving mechanism, while rotating the driving roller 101 in the discharging direction. As shown in FIG. 16, when the driving roller 101 reaches the disc storing position and grips the disc, the driving of the supporting chassis moving mechanism and the rotating of the driving roller 101 are stopped.

Then the driving roller 101 is moved back to the disc insertion opening by driving the supporting chassis moving mechanism without rotating the driving roller 101. When the driving roller 101 reaches the insertion starting position as shown in FIG. 15, the driving of the supporting chassis moving mechanism is stopped. Subsequently, the driving roller 101 is rotated in the disc discharging direction. Then the disc is discharged from the apparatus.

The operation for reproducing the disc stored in the disc storing device 300 is described. In the operation, the operation for moving the driving roller 101 from the insertion starting position to the disc storing position is the same as the operation for discharging the disc stored in the disc storing device 300.

The driving roller 101 is rotated in the disc discharging direction, while the supporting chassis moving mechanism is kept stationary. In the operation, the driving roller 101 is not moved, and hence only the disc is moved back toward the insertion opening.

When the disc contacts with disc stoppers 10a of the member 10, as shown in FIGS. 17 and 20a, the center of the disc coincides with the center of the turntable 201. The clamping operation shown in FIG. 10 is performed and the disc is reproduced.

The operation for discharging the disc from the turntable is described. The disc is released from the clamper 202. The driving roller 101 is rotated in the disc insertion direction, and as shown in FIG. 16 the disc is temporarily stored in the disc storing device 300, and the driving roller 101 is stopped.

The driving roller is moved back to the disc insertion opening side by driving the supporting chassis moving mechanism without rotating the driving roller 101. When the driving roller 101 reaches the insertion starting position as shown in FIG. 15, the supporting chassis moving mechanism is stopped. The driving roller 101 is rotated in the disc discharging direction, thereby discharging the disc from the apparatus.

The operation for storing the disc which has been reproduced into the disc storing device 300 is described. The disc is released from the clamper 202. The driving roller 101 is rotated in the disc inserting direction, and as shown in FIG. 16 the disc is stored in the disc storing device 300, and the driving roller 101 is stopped.

Thereafter, the driving roller is moved back to the disc insertion opening side by driving the supporting chassis moving mechanism, while the driving roller 101 is rotated in the disc inserting direction. Since the disc is pressed against the tray 301, only the driving roller 101 is moved back, leaving the disc on the tray 301. As shown in FIG. 18, when the driving roller 101 is moved back to the insertion starting position, movement of the driving roller 101 is stopped.

The small-diameter disc (8 cm CD) cannot be stored in the disc storing device 300. However the disc can be directly reproduced by inserting it from the outside of the apparatus. The operation is described with reference to FIGS. 21 to 27.

Figure 21:
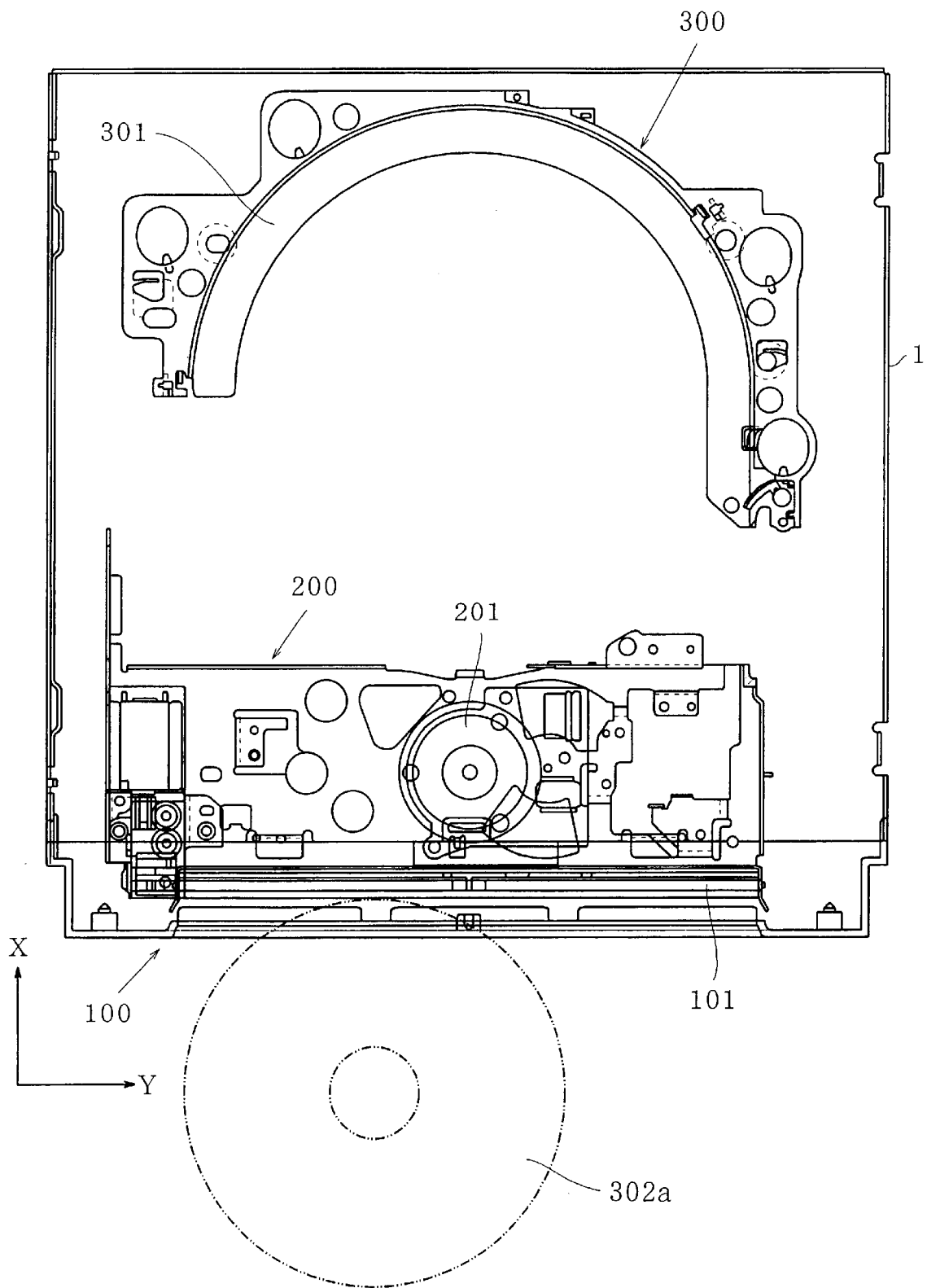
FIGS. 21 to 25 are plan views for explaining the operation of the reproducing of a small disc.

As shown in FIG. 21, the driving roller 101 is in the waiting state at the insertion starting position. When a user inserts a small disc 302a in the disc insertion opening of the front of the apparatus, the sensor detects insertion of the disc, and the driving roller 101 is rotated in the disc inserting direction to carrying the disc.

Figure 22:
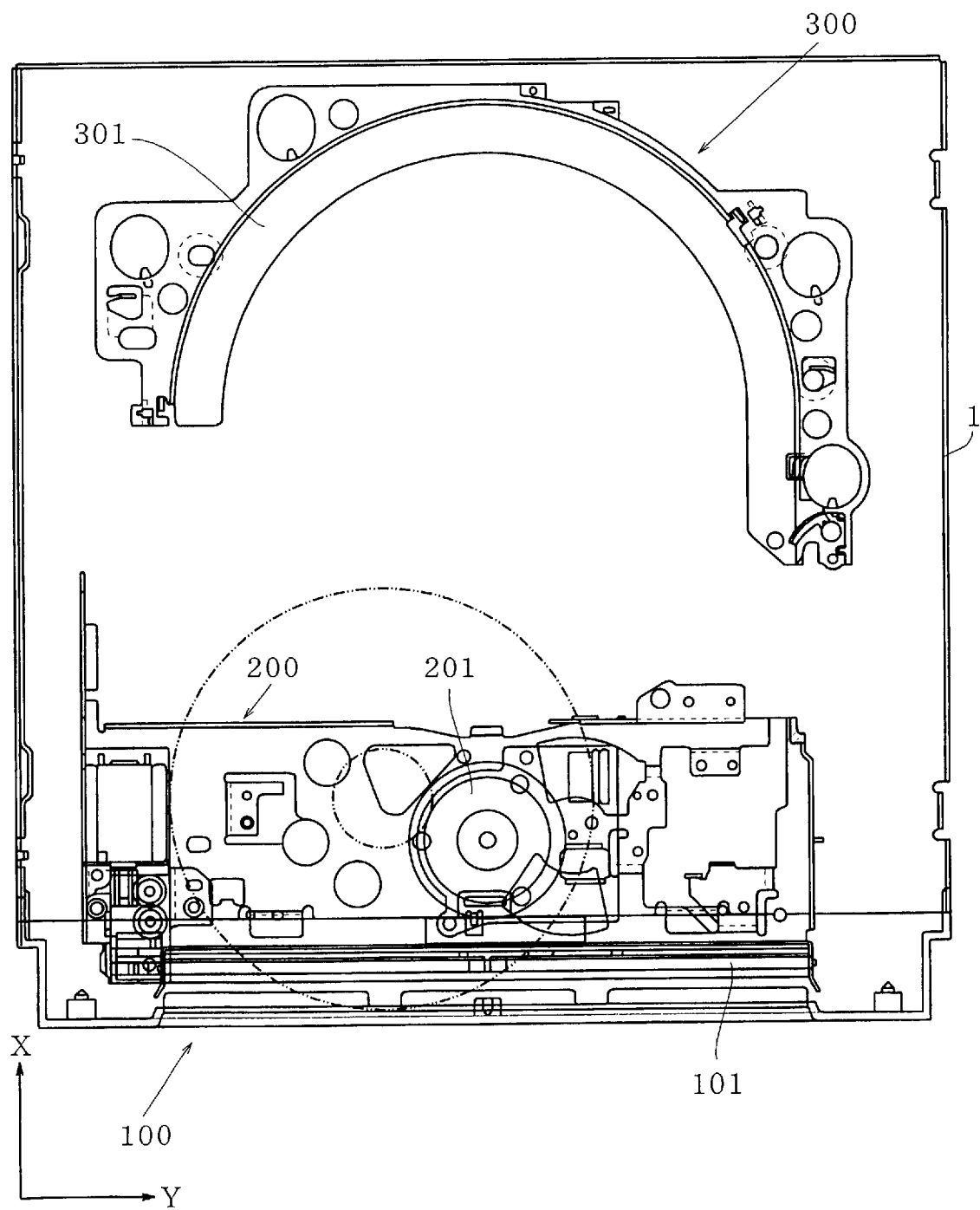
Figure 26A:
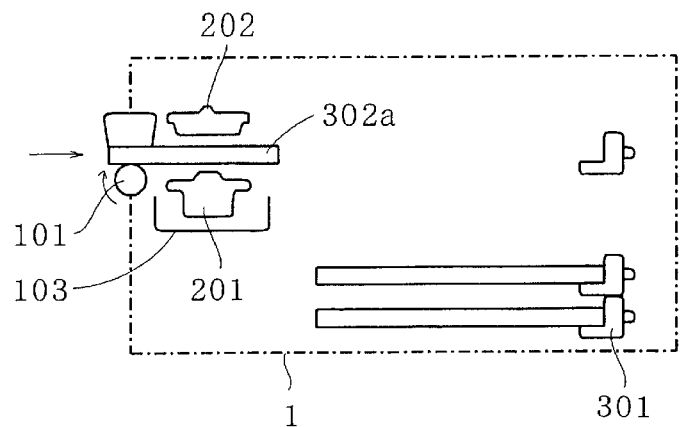
FIGS. 26a to 27b are side views showing the operation.

When the sensor determines that the disc is the 8 cm CD, the driving roller 101 is stopped at a position corresponding to the determined disc 302a. FIGS. 22 and 26a show the state where the driving roller 101 is stopped. Since the diameter of the disc 302a is shorter than the width of the disc insertion opening, the disc is scarcely positioned at the center of the insertion opening, as shown in FIG. 22.

Figure 23:
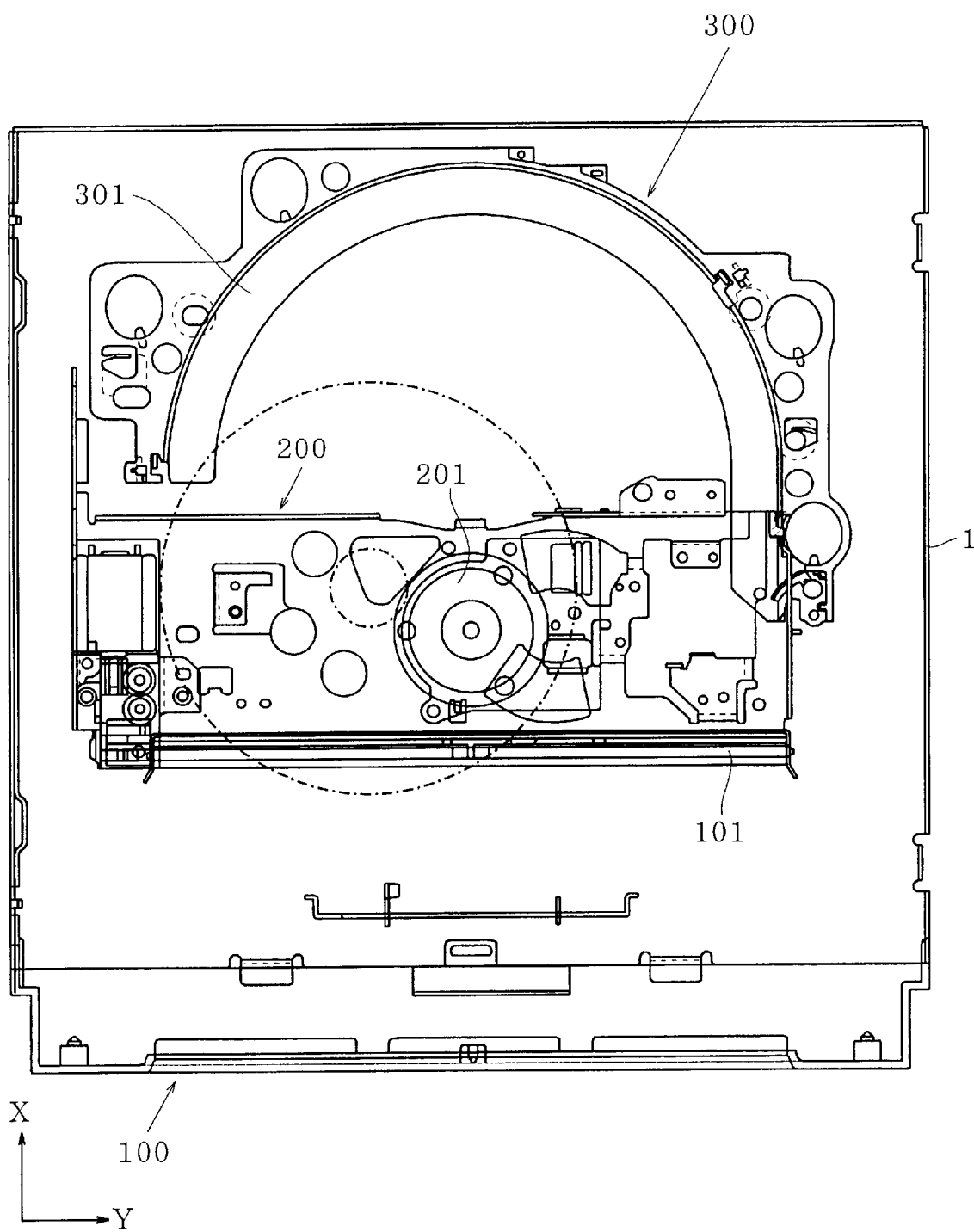
Figure 26B:
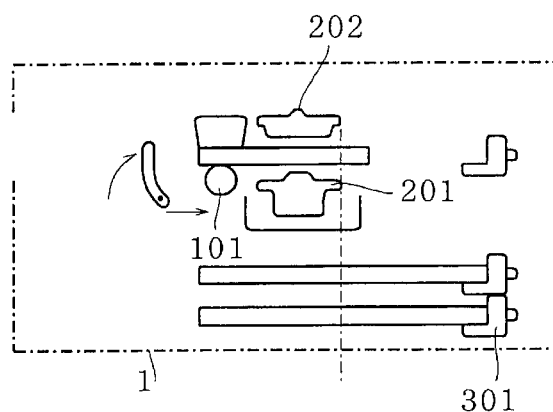

The supporting chassis moving mechanism is driven and the driving roller 101 and the disc reproducing device 200 are moved to the disc storing device 300. As shown in FIGS. 23 and 26b, when the driving roller 101 reaches the disc storing position where the large disc is held on the tray 301, the supporting chassis moving mechanism is stopped.

Figure 24:
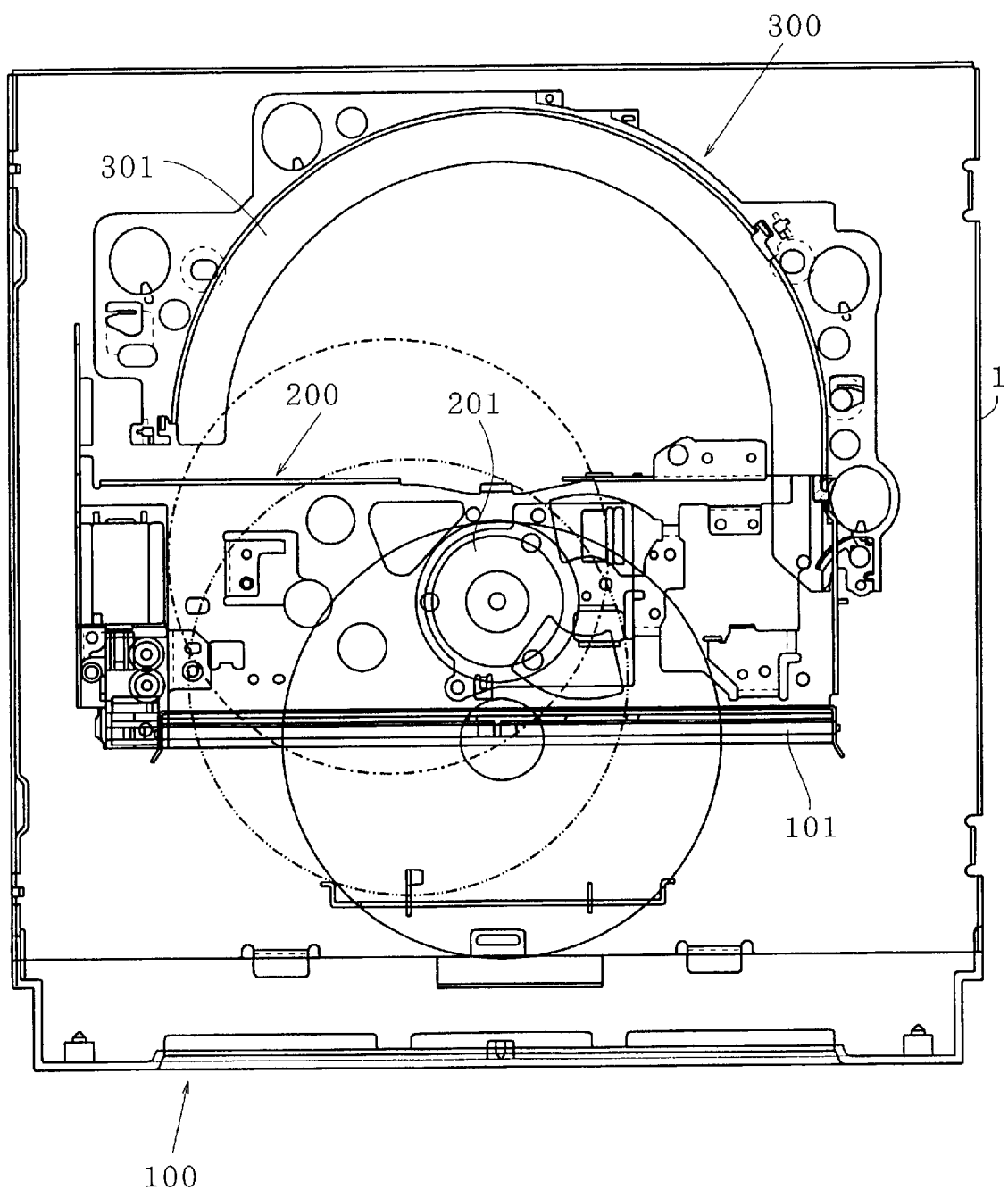
Figure 26C:
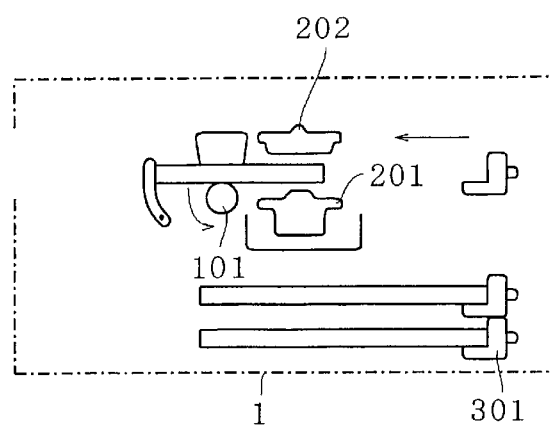

As shown in FIGS. 24 and 26c, the disc is moved back to the insertion opening by turning the driving roller 101 in the disc discharging direction. At that time, the disc is positioned at the center by being brought into contact with disc stoppers 10a of the erectable member 10.

Figure 25:
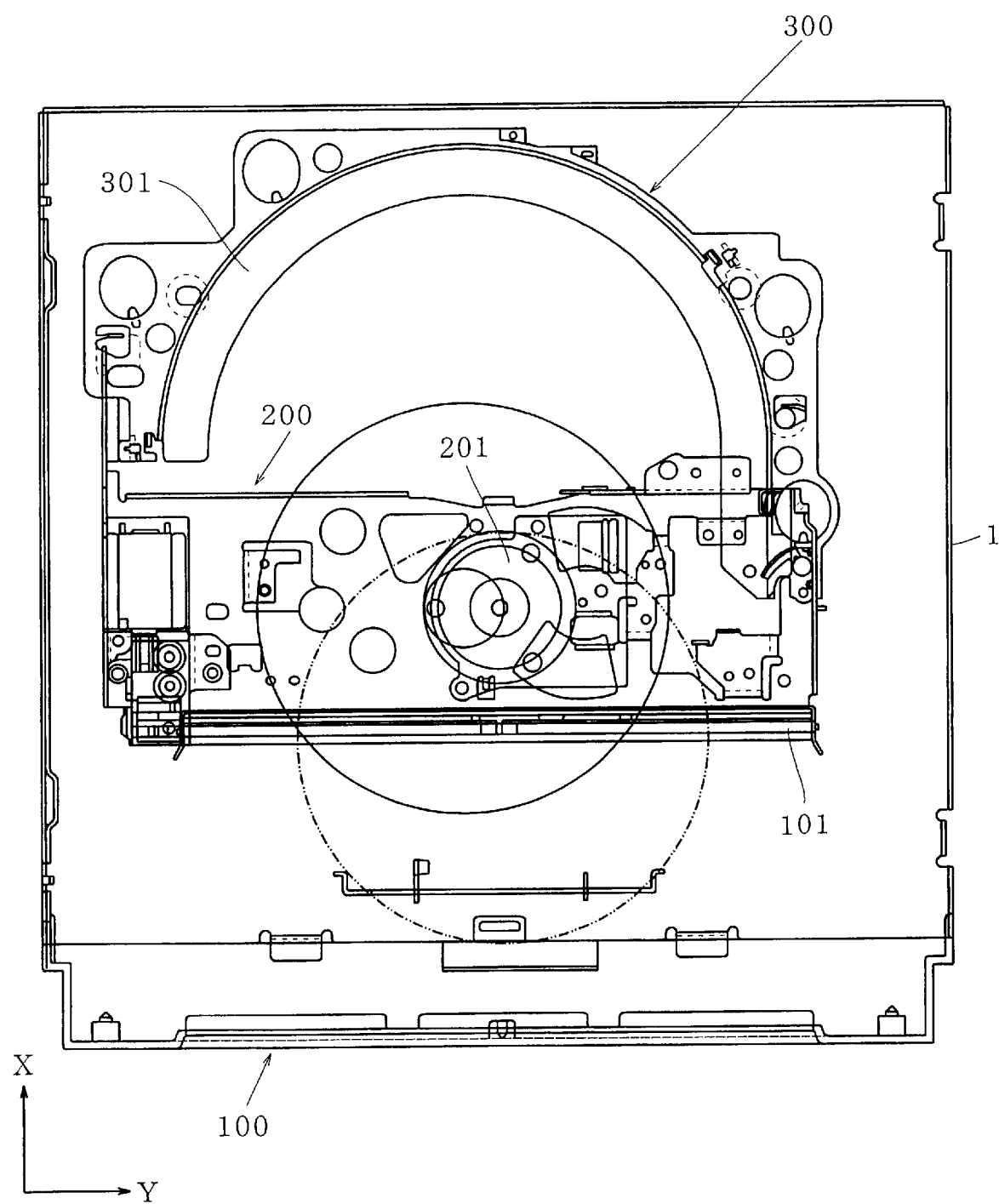
Figure 27A:
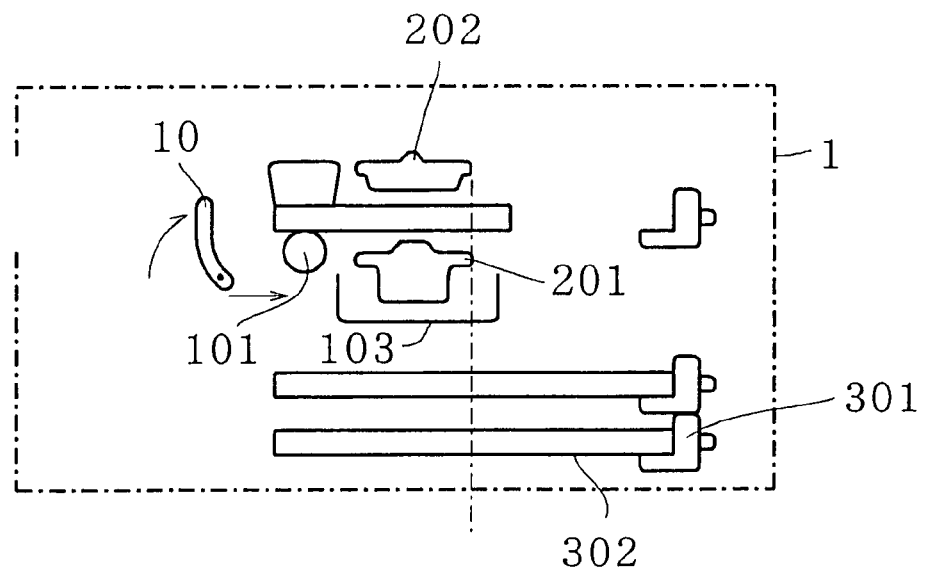

Thereafter, as shown in FIGS. 25 and 27a, the disc is positioned on the turntable 201 by turning the driving roller 101 by the predetermined number of rotations in the disc inserting direction.

Figure 27B:
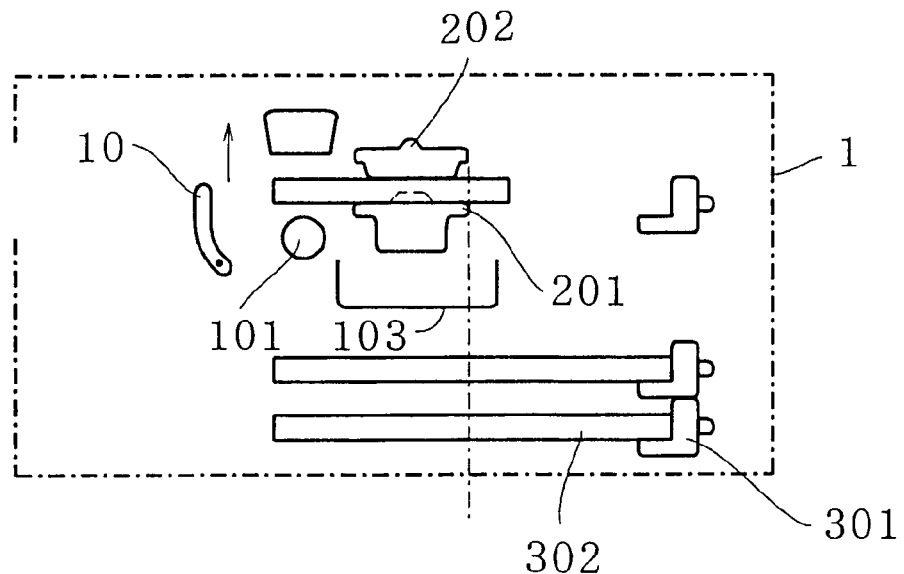
Figure 28:
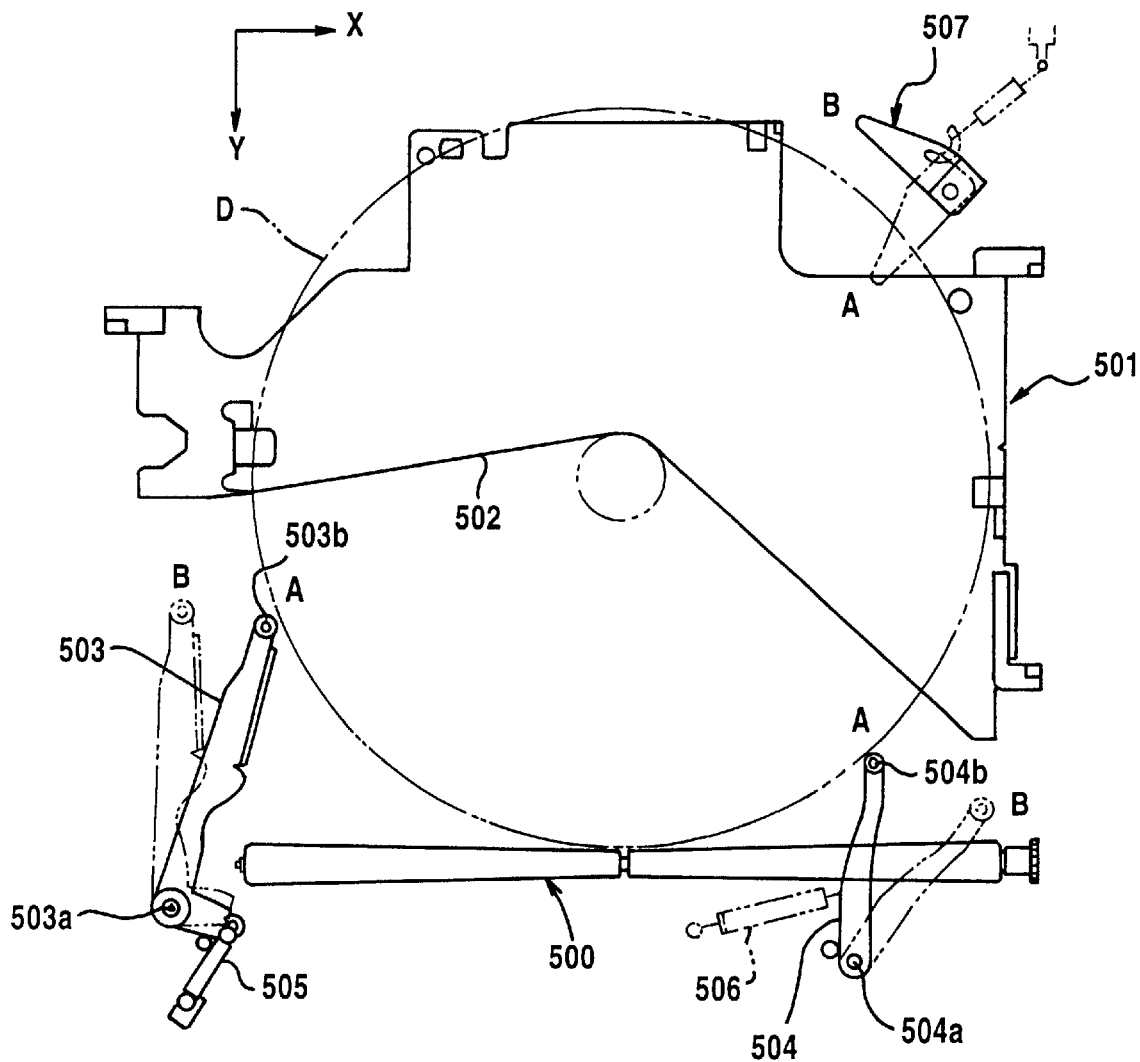
FIG. 28 is a plan view of a conventional device.

As shown in FIG. 27b, the clamping operation is performed and the disc is reproduced. After the reproduction and the releasing of the disc, the driving roller 101 is moved to the insertion starting position by driving the supporting chassis driving mechanism. The disc is discharged from the apparatus by rotating the driving roller 101 in the discharging direction.

Although the above described embodiment of the present invention is provided for storing a plurality of disc, the present invention may be applied to a device for reproducing a single disc.

In the apparatus of the present invention, there is not provided disc pulling out arms and a disc discharging arm. Therefore, the apparatus is simple in construction and can be manufactured at a low cost.

While the invention has been described in conjunction with preferred specific embodiment thereof, it will be understood that this description is intended to illustrate and not limit the scope of the invention, which is defined by the following claims.

What is claimed is:

1. An apparatus for reproducing an optical disc comprising:
   a disc reproducing device;
   a disc storing device having a plurality of trays each of which stores a disc;
   a supporting means movable between a position for inserting a disc and a predetermined position in the apparatus;
   a driving roller rotatably mounted on the supporting means;
   moving means for moving the supporting means in a predetermined direction said predetermined direction being parallel to a disc insertion direction, wherein an inserted disc is held by the driving roller and a movable plate operatively connected to the supporting means while the moving means moves the supporting means in the predetermined direction; and
   driving means for rotating the driving roller, wherein the inserted disc between the driving roller and the movable plate is moved in the predetermined direction.

2. The apparatus according to claim 1 wherein the disc reproducing device is mounted on the supporting means.

3. The apparatus according to claim 2 further comprising an erectable stopping member provided adjacent an opening to be stood when the driving roller is located at the disc storing device so as to prevent a disc from entering the apparatus.

4. The apparatus according to claim 3 wherein the driving roller is provided for carrying the disc between one of the trays and the disc reproducing device.

5. The apparatus according to claim 1 wherein the trays are vertically arranged.

6. The apparatus according to claim 5 further comprising moving means for moving the trays in a disc arranging direction.

7. The apparatus according to claim 1 wherein the disc reproducing device is located between the driving roller and the disc storing device.

8. The apparatus according to claim 7 wherein the driving roller is provided for carrying the disc between one of the trays and the disc reproducing device.

9. An apparatus for producing an optical disc, said apparatus comprising:
   a disc reproducing device;
   a disc storing device having a plurality of trays each of which stores a disc;
   a supporting means for supporting a disc reproducing device movable between a position for inserting a disc and a predetermined position in the apparatus;
   a driving roller mounted on the supporting means;
   moving means for moving the supporting means in a predetermined direction, said predetermined direction being parallel to a disc insertion direction;
   driving means for rotating the driving roller, wherein an inserted disc is moved in the predetermined direction and wherein the driving roller is provided for carrying the disc between one of the trays and the disc reproducing device;
   an erectable stopping member provided adjacent the opening to be stood when the driving roller is located at the disc storing device so as to prevent a disc from entering the apparatus, wherein the erectable stopping member is provided for positioning a disc carried from the disc storing device at a position corresponding to the disc reproducing device.

* * * * *